United States Patent
Pugh et al.

(10) Patent No.: US 10,565,546 B2
(45) Date of Patent: Feb. 18, 2020

(54) SYSTEM AND METHOD FOR OBTAINING OUT-OF-STOCK INVENTORY

(71) Applicant: Meijer, Inc., Grand Rapids, MI (US)

(72) Inventors: Brian Pugh, Grand Rapids, MI (US); Elmer L. Robinson, Jr., Marne, MI (US); David Scott Pallas, Hudsonville, MI (US)

(73) Assignee: Meijer, Inc., Grand Rapids, MI (US)

( * ) Notice: Subject to any disclaimer, the term of this patent is extended or adjusted under 35 U.S.C. 154(b) by 682 days.

(21) Appl. No.: 14/965,864

(22) Filed: Dec. 10, 2015

(65) Prior Publication Data

US 2016/0171432 A1 Jun. 16, 2016

Related U.S. Application Data

(60) Provisional application No. 62/090,165, filed on Dec. 10, 2014.

(51) Int. Cl.
| | | |
|---|---|---|
| *G06Q 10/08* | (2012.01) | |
| *G06Q 30/06* | (2012.01) | |
| *G06Q 30/02* | (2012.01) | |

(52) U.S. Cl.
CPC ....... *G06Q 10/087* (2013.01); *G06Q 30/0222* (2013.01); *G06Q 30/0635* (2013.01)

(58) Field of Classification Search
None
See application file for complete search history.

(56) References Cited

U.S. PATENT DOCUMENTS

| | | | | |
|---|---|---|---|---|
| 7,596,513 B2* | 9/2009 | Fargo | ..................... | G06Q 30/00 |
| | | | | 705/26.62 |
| 2002/0116212 A1* | 8/2002 | Shaw | ..................... | G06Q 10/06 |
| | | | | 705/26.1 |
| 2005/0108096 A1* | 5/2005 | Burger | ..................... | G06F 21/32 |
| | | | | 705/14.38 |
| 2007/0228163 A1* | 10/2007 | Schon | ..................... | G06Q 10/06 |
| | | | | 235/383 |
| 2009/0012704 A1* | 1/2009 | Franco | ..................... | G01C 21/20 |
| | | | | 701/532 |
| 2016/0140632 A1* | 5/2016 | Kandala | ............. | G06Q 30/0603 |
| | | | | 705/26.61 |

* cited by examiner

*Primary Examiner* — Allen C Chein
*Assistant Examiner* — Denisse Y Ortiz Roman
(74) *Attorney, Agent, or Firm* — Barnes & Thornburg LLP

(57) ABSTRACT

In a system and method for obtaining out of stock inventory at a retail enterprise, stored product codes are associated with one or more store codes and each associated store code is associated with an inventory number. The product codes identify products for sale, the store codes identify stores that normally stock the identified products and each inventory number identifies the number of the products in inventory at each store. In response to a wirelessly received product code, store code and customer code, a processor determines the stored product code that matches the wirelessly received product code, the associated store code that matches the wirelessly received store code and its associated inventory number, and controls a communication circuit to wirelessly transmit a notification message to the mobile communication device that transmitted the codes. The notification message illustratively relates to the availability within the retail enterprise of the identified product.

8 Claims, 11 Drawing Sheets

SYSTEM AND METHOD FOR OBTAINING OUT-OF-STOCK INVENTORY

CROSS-REFERENCE TO RELATED APPLICATIONS

This patent application claims the benefit of, and priority to, U.S. Provisional Patent Application Ser. No. 62/090,165, filed Dec. 10, 2014, the disclosure of which is expressly incorporated herein by reference.

FIELD OF THE INVENTION

The present invention relates generally to systems and methods via which customers of a retail enterprise can obtain out-of-stock inventory items, and more specifically to systems and methods for providing various mechanisms via which customers can obtain such items.

BACKGROUND

Retailers of goods and services typically offer such goods and services for purchase via one or more conventional brick-and-mortar retail stores. In such stores, items for purchase are typically stocked in quantity on shelving and/or display units, and visiting customers typically select desired items for purchase from such shelving and/or display units. From time to time, an item that a customer wishes to purchase may not be stocked in a sufficient quantity on a shelving and/or display unit to satisfy the customer's needs, or may be completely missing from its stock location on the shelving and/or display unit, i.e., "out-of-stock." It may therefore be desirable for retailers to provide one or more mechanisms by which a customer can obtain a desired quantity of an item that is out-of-stock or that is not stocked in sufficient quantity to satisfy the customer's needs.

SUMMARY

The present invention may comprise one or more of the features recited in the attached claims, and/or one or more of the following features and combinations thereof. In one aspect, a method of obtaining out of stock inventory at a retail enterprise may comprise associating, with a processor in a first database, each of a plurality of product codes stored in the first database with one or more of a plurality of store codes and each of the associated one or more of the plurality of store codes with an inventory number, each of the plurality of product codes identifying a corresponding one of a plurality of products offered for sale by the retail enterprise, each of the one or more of the plurality of store codes identifying a different one of a plurality of brick-and-mortar stores of the retail enterprise that normally stocks the product identified by the associated one of the plurality of product codes, and each inventory number identifying a number of the products identified by the associated one of the plurality of product codes in inventory at the brick-and-mortar store identified by the associated one of the plurality of store codes, associating, with a processor in the first or a second database, each of a plurality of customer codes with a different one of a plurality of customers of the retail enterprise, and in response to wirelessly received information including a product code, a store code and a customer code, determining with the processor the one of the plurality of product codes in the first database that matches the wirelessly received product code, determining with the processor the one of one or more of the plurality of store codes associated in the first database with the determined product code that matches the wirelessly received store code, determining with the processor the inventory number associated in the first database with the determined one of the plurality of store codes, determining with the processor the one of the plurality of customer codes in the first or second database that matches the wirelessly received customer code, and wirelessly transmitting, under control of the processor, a notification message to a mobile communication device identified by the determined one of the plurality of customer codes, the notification message including information relating an availability within the retail enterprise of the product identified by the determined one of the plurality of product codes.

In another aspect, a system for obtaining out of stock inventory at a retail enterprise may comprise at least one database having stored therein a plurality of product codes each associated in the at least one database with one or more of a plurality of store codes and each of the associated one or more of the plurality of store codes associated in the at least one database with an inventory number, each of the plurality of product codes identifying a corresponding one of a plurality of products offered for sale by the retail enterprise, each of the one or more of the plurality of store codes identifying a different one of a plurality of brick-and-mortar stores of the retail enterprise that normally stocks the product identified by the associated one of the plurality of product codes, and each inventory number identifying a number of the products identified by the associated one of the plurality of product codes in inventory at the brick-and-mortar store identified by the associated one of the plurality of store codes, the at least one database further having stored therein a plurality of customer codes each associated with a different one of a plurality of customers of the retail enterprise, a communication circuit, a processor, and a memory having instructions stored therein which, when executed by the processor, cause the processor to, in response to wirelessly received information via the communication circuit including a product code, a store code and a customer code, determine the one of the plurality of product codes in the at least one database that matches the wirelessly received product code, determine the one of one or more of the plurality of store codes associated in the at least one database with the determined product code that matches the wirelessly received store code, determine the inventory number associated in the at least one database with the determined one of the plurality of store codes, determine the one of the plurality of customer codes in the at least one database that matches the wirelessly received customer code, and controlling the communication circuit to wirelessly transmit a notification message to a mobile communication device identified by the determined one of the plurality of customer codes, the notification message including information relating an availability within the retail enterprise of the product identified by the determined one of the plurality of product codes.

In yet another aspect, a system for obtaining out of stock inventory at a retail enterprise may comprise at least one database having stored therein a plurality of product codes each associated in the at least one database with one or more of a plurality of store codes and each of the associated one or more of the plurality of store codes associated in the at least one database with an inventory number, each of the plurality of product codes identifying a corresponding one of a plurality of products offered for sale by the retail enterprise, each of the one or more of the plurality of store codes identifying a different one of a plurality of brick-and-mortar stores of the retail enterprise that normally stocks the product identified by the associated one of the plurality of product codes, and each inventory number identifying a number of the products identified by the associated one of the plurality of product codes in inventory at the brick-and-mortar store identified by the associated one of the plurality of store codes, the at least one database further having stored therein a plurality of customer codes each associated with a different one of a plurality of customers of the retail enterprise, a communication circuit, and a server coupled to the communication circuit, the server including one or more modules to, in response to wirelessly received information via the communication circuit including a product code, a store code and a customer code, determine the one of the plurality of product codes in the at least one database that matches the wirelessly received product code, determine the one of one or more of the plurality of store codes associated in the at least one database with the determined product code that matches the wirelessly received store code, determine the inventory number associated in the at least one database with the determined one of the plurality of store codes, determine the one of the plurality of customer codes in the at least one database that matches the wirelessly received customer code, and wirelessly transmit via the communication circuit a notification message to a mobile communication device identified by the determined one of the plurality of customer codes, the notification message including information relating an availability within the retail enterprise of the product identified by the determined one of the plurality of product codes.

In a further aspect, a non-transitory machine-readable medium may comprise a plurality of instructions which, when executed by at least one processor, result in the at least one processor associating, in a first database, each of a plurality of product codes stored in the first database with one or more of a plurality of store codes and each of the associated one or more of the plurality of store codes with an inventory number, each of the plurality of product codes identifying a corresponding one of a plurality of products offered for sale by the retail enterprise, each of the one or more of the plurality of store codes identifying a different one of a plurality of brick-and-mortar stores of the retail enterprise that normally stocks the product identified by the associated one of the plurality of product codes, and each inventory number identifying a number of the products identified by the associated one of the plurality of product codes in inventory at the brick-and-mortar store identified by the associated one of the plurality of store codes, associating, in the first or a second database, each of a plurality of customer codes with a different one of a plurality of customers of the retail enterprise, and in response to wirelessly received information including a product code, a store code and a customer code, determining the one of the plurality of product codes in the first database that matches the wirelessly received product code, determining the one of one or more of the plurality of store codes associated in the first database with the determined product code that matches the wirelessly received store code, determining the inventory number associated in the first database with the determined one of the plurality of store codes, determining the one of the plurality of customer codes in the first or second database that matches the wirelessly received customer code, and controlling a communication circuit to wirelessly transmit a notification message to a mobile communication device identified by the determined one of the plurality of customer codes, the notification message including information relating an availability within the retail enterprise of the product identified by the determined one of the plurality of product codes.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

DETAILED DESCRIPTION OF THE DRAWINGS

Figure 1:
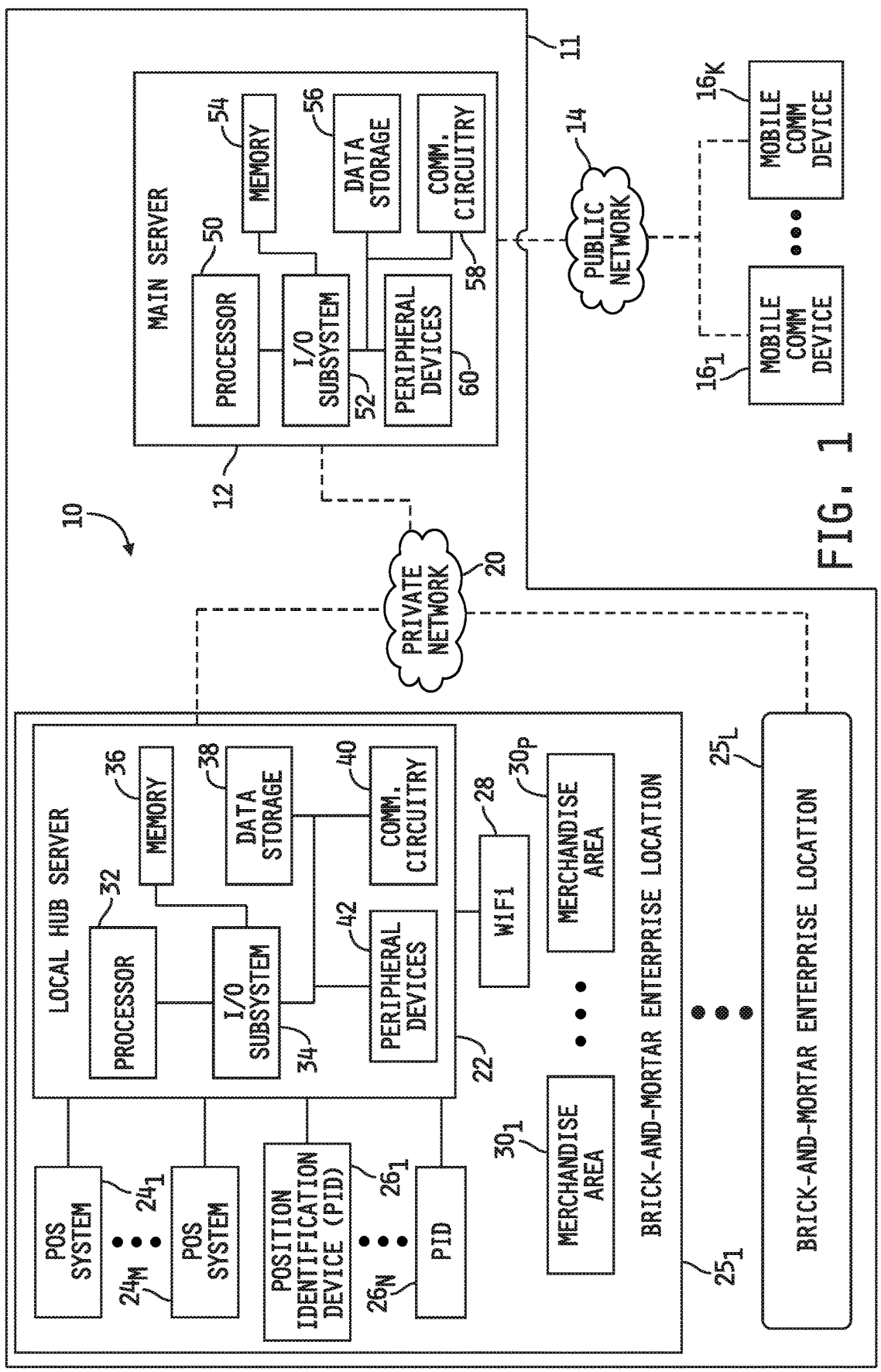
FIG. 1 is a simplified block diagram of an embodiment of a system for obtaining out-of-stock inventory.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure, process, process step or characteristic is described in connection with an embodiment, it is submitted that it is within the knowledge of one skilled in the art to effect such feature, structure, process, process step or characteristic in connection with other embodiments whether or not explicitly described. Further still, it is contemplated that any single feature, structure, process, process step or characteristic, and/or any subset of features, structures, process, process steps or characteristics, disclosed herein may be combined with any one or more other disclosed feature, structure, process, process step or characteristic, whether or not explicitly described, and it will be understood that no limitations on the types and/or number of such combinations are therefore intended or should be inferred.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more machine-readable media, which may be read and executed by one or more processors. A machine-readable medium should be understood to mean a non-transitory machine-readable medium, i.e., one that does not include transitory signals, and such a machine-readable medium may illustratively be embodied as any device or physical structure for storing or transmitting information in a form readable by a machine (e.g., a computing device). For example, and without limitation, a machine-readable medium may be embodied as any one or combination of read only memory (ROM); random access memory (RAM); magnetic disk storage media; optical storage media; flash memory devices; and others.

System Components

Referring now to FIG. 1, a system 10 is shown for obtaining out-of-stock inventory at a retail enterprise. The system 10 includes a retail enterprise 11 having a main server 12 configured to communicate with customers of the retail enterprise via a public network 14, e.g., the Internet, and customers may access the public network 14 using any conventional public network accessible electronic device and/or system. In the illustrated embodiment, for example a number, J, of mobile communication devices $16_1$-$16_J$ are shown, where J may be any positive integer. The retail enterprise 11 may include any number of brick-and-mortar retail stores or locations $25_1$-$25_L$ each having one or more point-of-sale systems $24_1$-$24_M$ operating therein, each including any number, N, of position identification devices (PIDs) $26_1$-$26_N$, and each including any number, P, of merchandise areas $30_1$-$30_P$, e.g., areas where merchandise may be displayed for sale, wherein L, N and P may each by any positive integer. As used herein, the phrases "brick-and-mortar enterprise location" and brick-and-mortar store" will be understood to be synonymous. In any case, the main server 12 is configured to communicate with each such point-of-sale (POS) system $24_1$-$24_M$, each of which operates in a conventional manner to process items to be purchased by customers during purchase transactions. In some embodiments, as will be described in greater detail below, the main server 12 may be coupled, e.g., via a private network 20, to one or more local hub servers $22_1$-$22_L$ each associated with one of the brick-and-mortar stores $25_1$-$25_L$, wherein each such hub server $22_1$-$22_L$ is communicatively coupled to the POS system(s) $24_1$-$24_M$ and to the position identification device(s) $26_1$-$26_N$. In some alternate embodiments, some or all of the local hub servers $22_1$-$22_L$ may be omitted and for each such omitted local hub server $22_1$-$22_L$, the main server 12 may be coupled directly to the corresponding POS system(s) $24_1$-$24_M$ and to the position identification device(s) $26_1$-$26_N$. In other alternate embodiments, one or more of the position identification devices $26_1$-$26_N$ may not be communicatively coupled to the corresponding hub server 22 (or to the main server 12), but may instead be coupled only to a source of electrical power or to nothing at all.

Each of the brick-and-mortar stores $25_1$-$25_L$ may further include at least one conventional WiFi Access Point 28 which may be coupled to the corresponding local hub server $22_1$-$22_L$, or directly to the main server 12 in any one or more of the brick-and-mortar stores $25_1$-$25_L$ not having an associated local hub server $22_1$-$22_L$. Each such WiFi Access Point 28 is illustratively controlled by the main server 12 (or corresponding local hub server 22) in a conventional manner to establish at least one corresponding Internet hotspot within the brick-and-mortar store 25 via which customers (and employees) can access the public network 14, e.g., to access the Internet, using any conventional public network accessible electronic device and/or system, e.g., such as with any of the plurality of mobile communication devices $16_1$-$16_K$.

As illustrated in FIG. 1, one or more of the brick-and-mortar stores $25_1$-$25_L$ may include one or more position identification devices $26_1$-$26_N$ (PIDs) via which the position or location of a customer's (and/or employee's) mobile communication device $16_1$-$16_K$, and thus the position or location of the associated customer (or employee), relative to the brick-and-mortar stores $25_1$-$25_L$, and/or relative to one or more structures or locations within an identified one of the brick-and-mortar stores $25_1$-$25_L$ can be determined. Examples of various embodiments of the one or more position identification devices $26_1$-$26_N$ and their operation will be described in detail hereinafter with respect to FIGS. 6A and 6B.

In the embodiment illustrated in FIG. 1, the main server 12 is illustratively coupled via a private network 20 to a plurality of local hub servers 22, each associated with a different one of the one or more brick-and-mortar stores $25_1$-$25_L$. Some retail enterprises 11 may include a single brick and mortar outlet 25, and other larger retail enterprises 11 may include two or more physically remote brick and mortar outlets $25_1$-$25_L$. In the latter case, the retail enterprise 11 may include, for example, a main physical location with two or more remote physical locations, and for purposes of this document the two or remote physical locations in such an arrangement are referred to as "hub" locations. In this disclosure, the system 10 will be illustrated and described in the context of such a larger retail enterprise having a main physical location and two or more physical hub locations. In this regard, the main server 12 in the system 10 shown in FIG. 1 will typically be located at a main business location of the retail enterprise, and will be coupled via the network 20 to two or more local hub servers 22, each of which will typically be located at a different one of the two or more hub locations. In embodiments which do not include any local hub servers $22_1$-$22_L$, the main server 12 will be coupled via the network 20 to the one or more POS systems $24_1$-$24_M$, to the one or more position identification devices (PIDs) $26_1$-$26_N$ (in embodiments in which the one or more PIDs $26_1$-$26_N$ is/are directly coupled to any device or system), and to the at least one WiFi Access Point 28. In any case, communicative coupling between the local hub server 22 or the main server 12 and the one or more point-of-sale systems 24$_1$-24$_M$, the one or more PIDs 26$_1$-26$_N$ and the at least one WiFi Access Point 28 may be accomplished using any known hardwire and/or wireless communication coupling, and communications over any such hardwire and/or wireless coupling may be accomplished using any known communication protocol.

In some alternative embodiments, as described above, one or more (or all) of the local hub servers 22$_1$-22$_L$ may be omitted. In other alternative embodiments, the main server 12 may be omitted and at least one of the local hub servers 22 may be configured to act as a so-called master server with the remaining local hub servers 22 configured to act as so-called slave servers. In still other alternative embodiments in which the retail enterprise 11 includes only a single brick and mortar outlet, the local hub servers 22 may be or include the main server 12 or vice versa. For purposes of the following description, any process disclosed as being controlled by the main server 12 may, in some embodiments, instead be controlled, in whole or in part, by one or more local hub servers 22 and vice versa, and/or may be controlled, in whole or in part, by one of the point-of-sale systems 24$_1$-24$_M$ and vice versa.

In embodiments which include one or more local hub servers 22$_1$-22$_L$, each such local hub server 22 may be embodied as any type of server (e.g., a web server) or similar computing device capable of performing the functions described herein. In the illustrative embodiment of FIG. 1, the local hub server 22 includes a processor 32, an I/O subsystem 34, a memory 36, a data storage 38, a communication circuitry 40, and one or more peripheral devices 42. It should be appreciated that the local hub server 22 may include other components, sub-components, and devices commonly found in a server and/or computing device, which are not illustrated in FIG. 1 for clarity of the description.

The processor 32 of the local hub server 22 may be embodied as any type of processor capable of executing software/firmware, such as a microprocessor, digital signal processor, microcontroller, or the like. The processor 32 may be a single processor or include multiple processors. The I/O subsystem 34 of the local hub server 22 may be embodied as circuitry and/or components to facilitate input/output operations with the processor 32 and/or other components of the local hub server 22. The processor 32 is communicatively coupled to the I/O subsystem 34.

The memory 36 of the user local hub server 22 may be embodied as or otherwise include one or more conventional volatile and/or non-volatile memory devices. The memory 36 is communicatively coupled to the I/O subsystem 34 via a number of signal paths. Although only a single memory device 36 is illustrated in FIG. 1, the local hub server 22 may be or include any number of memory devices. Various data and software may be stored in the memory 36. The data storage 38 is also communicatively coupled to the I/O subsystem 34 via a number of signal paths, and may be embodied as any type of device or devices configured for the short-term or long-term storage of data such as, for example, memory devices and circuits, memory cards, hard disk drives, solid-state drives, or other data storage devices.

The communication circuitry 40 of the local hub server 22 may include any number of devices and circuitry for enabling communications between the local hub sever 22 and the main server 12 and/or between the local hub server 22 and the one or more point-of-sale systems 24$_1$-24$_M$ (and/or, in some embodiments, between the local hub server 22 and the one or more position identification devices 26$_1$-26$_N$). In the illustrated embodiment, for example, communication between the local hub server 22 and the main server 12 takes place wirelessly via the network 20, wherein the network 20 may represent, for example, a private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the local hub server 22 and the main server 12 may be a non-private network and/or may be, in whole or in part, a wired connection. Generally, the communication circuitry 40 may be configured to use any one or more, or combination, of conventional secure and/or unsecure communication protocols to communicate with the main server 12. As such, the network 20 may include any number of additional devices, such as additional computers, routers, and switches, to facilitate communications between the local hub server 22 and the main server 12. Communication between the local hub server 22 and the one or more point-of-sale systems 24$_1$-24$_M$ (and/or, in some embodiments, between the local hub server 22 and the one or more position identification devices 26$_1$-26$_N$) may take place via one or more such wireless communication interfaces and/or via one or more conventional wired interfaces.

In some embodiments, the local hub server 22 may also include one or more peripheral devices 42. Such peripheral devices 42 may include, for example, but are not limited to, any number of additional input/output devices, interface devices, and/or other peripheral devices. For example, the peripheral devices 42 may include a display, a keyboard, a mouse, audio processing circuitry, and/or other input/output devices.

Others of the local hub servers 22$_1$-22$_L$, e.g., serving other brick-and-mortar locations 25$_1$-25$_L$, may be substantially similar to the local hub server 22 and include similar components. As such, the description provided above of the components of the local hub server 22 may be equally applicable to such similar components of other local hub servers and are not repeated herein so as not to obscure the present disclosure. Of course, it should be appreciated that in some embodiments one or more of the local hub servers 22 and may be dissimilar to others of the local hub servers 22.

An embodiment of the main server 12 is also illustrated in FIG. 1, and generally includes the same components as the local hub server 22. For example, a processor 50 is coupled to an I/O subsystem 52, and the I/O subsystem 52 is coupled to a memory 54, a data storage unit 56, communication circuitry 58 and one or more peripheral devices 60. In some embodiments, each of the foregoing components may be identical to corresponding components of the local hub server 22 described above, and a detailed explanation of such components will not be repeated here for brevity. In other embodiments, the main server 12 may be configured differently than the local hub server 22 described above. In any case, the communication circuitry 40 of each of the local hub servers 22 facilitates communication with the communication circuitry 58 of the main server 12 and vice versa so that information can be shared between the main server 12 and each of the one or more local hub servers 22 via the network 20. Although only one such main server 12 is shown in FIG. 1, it should be appreciated that, in other embodiments, the system 10 may include any number of main servers, and in still other embodiments the main server 12 may be communicatively coupled to one or more remote servers of the retail enterprise. Any such one or more remote servers may include any structure or feature illustrated and described herein with respect to the main server 12, and may be configured to execute any one or more functions described with respect to the main server 12 either alternatively to the main server 12 or in addition to the main server 12. In any case, the main server 12 may be embodied as any type of server (e.g., a web server) or similar computing device capable of performing the functions described herein.

In embodiments in which the one or more point-of-sale systems $24_1$-$24_M$, the WiFi Access Point 28 and the one or more position identification devices $26_1$-$26_N$ are controlled by the main server 12 (in embodiments in which the one or more position identification devices $26_1$-$26_N$ are controlled by the main server 12 at all), and also in embodiments in which such components are controlled by one or more of the local hub servers $22_1$-$22_L$, it will be understood that any such server may be or include a single server, multiple servers, one or more cloud servers, i.e., one or more dedicated hosting and/or shared hosting, off-site servers providing server resources to the retail enterprise according to a rental or lease arrangement, one or more shared-processor servers, two or more point-to-point server, or the like.

The mobile communication devices $16_1$-$16_J$ illustrated in FIG. 1 are intended to depict mobile communication devices that are each separately owned and/or operated by a different customer (and, in some embodiments by employees of the retail enterprise 11). No limit on the total number of such mobile communication devices $16_1$-$16_J$ that may be owned and operated by any one customer (or employee), or on the total number of such mobile communication devices $16_1$-$16_J$ that may communicate with the main server 12, is intended or should be inferred. The mobile communication devices $16_1$-$16_J$ may be or include any mobile electronic device capable of executing one or more software application programs as described herein and of communicating with the main server 12 via the public network 14. Examples of the mobile communication devices $16_1$-$16_J$ include, but should not be limited to, mobile telephones, smart phones, tablet computers, personal data assistants (PDAs), wearable electronic communication devices, including eye glasses, watches, devices attached to and/or integral with clothing, headwear and/or footwear, implanted electronic communication devices, and the like. Other examples include any one or more such mobile communication devices mounted to or integral with a mobile structure and configured to communicate with, or to at least wirelessly exchange some amount of information with, any of the foregoing example customer (and/or employee) mobile communication devices, and examples of such mobile structures include, but are not limited to, a wheeled cart, such as a conventional shopping cart or other wheeled cart, basket, platform or carriage, a manually-carried shopping basket, a wheeled or non-wheeled walking aid, a wheelchair, an electrically powered or motorized vehicle such as a mobility scooter, and the like.

Mobile Communication Device Components

Figure 2:
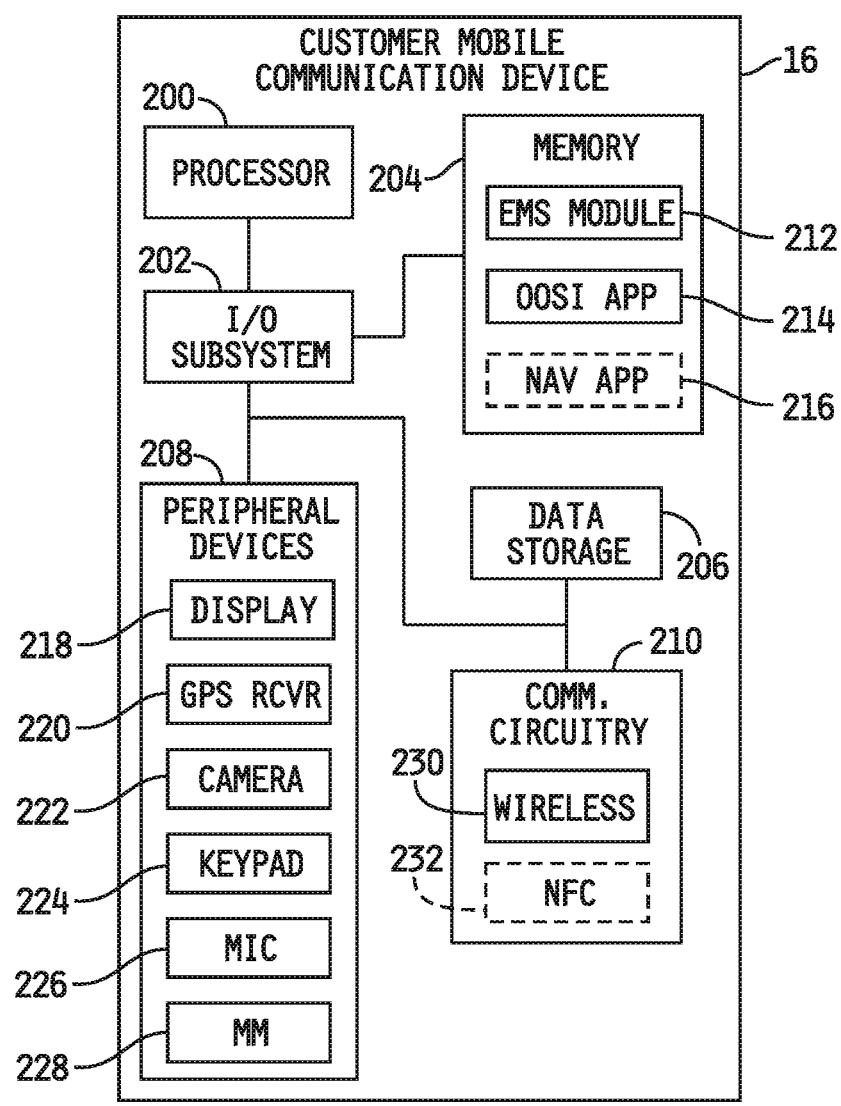
FIG. 2 is a simplified block diagram of an embodiment of one of the mobile communication devices illustrated in FIG. 1.

Referring now to FIG. 2, an embodiment 16 of the mobile communication devices $16_1$-$16_K$ illustrated in FIG. 1 is shown which illustratively includes components similar to the main server 12 and also to the one or more local hub servers 22 and the one or more POS systems $24_1$-$24_M$ such as a processor 200, an I/O subsystem 202, a memory 204, a data storage device 206, a number of peripheral devices 208 and communication circuitry 210. In some embodiments, each of the foregoing components may be identical to corresponding components of the local hub server 22 described above, and a detailed explanation of such components will not be repeated here for brevity. In other embodiments, any of the one or more mobile communication devices $16_1$-$16_J$ may be configured differently than the local hub server 22 described above. It will be appreciated that the mobile communication device 16 may include other components, sub-components, and devices commonly found in a computer and/or computing device.

The memory 204 illustratively includes an EMS module 212 in the form of, e.g., instructions executable by the processor 200, to communicate EMS customer-member information to and from the main server 12, to control one or more local peripheral devices to facilitate communications between EMS customer members and the main server 12 and to facilitate customer input into the device 16 of EMS customer information. The terms "EMS," "EMS customer-member information" and "EMS customer members" will be defined and described hereinafter with respect to main server environment illustrated in FIG. 3. The memory 204 further illustratively includes an out-of-stock inventory (OOSI) application 214 in the form of, e.g., instructions executable by the processor 200, to facilitate obtaining out-of-stock inventory by a customer carrying the mobile communication device 16, i.e., to facilitate obtaining by the customer of a product that is not present, or that is not present in a quantity desired by the customer, in an area of a particular one of the brick-and-mortar stores $25_1$-$25_L$ in which the product is typically stocked. Example embodiments of processes executed by the processor 200 of the customer mobile communication devices $16_1$-$16_K$ according to the OOSI application 214 are illustrated in FIGS. 5-11, and such processes will be described in detail hereinafter.

The memory 204 may further optionally include a conventional navigation (NAV) application 216, as depicted in FIG. 2 in dashed-line representation, in the form of, e.g., instructions executable by the processor 200, to provide voice and/or visual navigation guidance via a display on-board the mobile communication device 16.

In addition to, or alternatively to, the number of peripheral devices 42 of the local hub server 22 described above, the number of peripheral devices 208 of the mobile communication device 16 may include any number of other or additional peripheral or interface devices. Examples of such additional peripheral devices illustrated in FIG. 2 include, but should not be limited to, a conventional visual display unit or screen 218, a conventional global positioning system (GPS) receiver 220, a conventional camera 222, a conventional keypad 224, a conventional microphone 226 and a conventional magnetometer 228. The display 218 is configured, in a conventional manner, to be responsive to instructions produced by the processor 200 to display information thereon. The GPS receiver 218 is configured, in a conventional manner, to receive radio-frequency signals transmitted by earth-orbiting satellites and to produce corresponding signals from which geographical coordinates of the receiver 220 are or can be determined. The camera 222 is configured, in a conventional manner, to capture images and/or video and to display the same on the display 218. The keypad 224 is configured, in a conventional manner, to provide signals corresponding to manual selection and activation thereof to the processor 200, and the microphone 226 is configured, in a conventional manner, to capture sound waves and to provide signals corresponding thereto to the processor 200.

The magnetometer 228 is configured, in a conventional manner, to detect local geomagnetic fields, to produce magnetic signature signals based thereon and to provide such signals to the processor 200.

The communication circuitry 210 illustratively includes conventional wireless communication circuitry 230. In some embodiments, the wireless communication circuitry 230 is configured to conduct and facilitate cellular telephone communications with other cellular and land-based communication devices. In some embodiments, the wireless communication circuitry 230 is configured to conduct and facilitate communication with the main server 12 via the network 14. In some embodiments, the wireless communication circuitry 230 is configured to access the network 14 via at least one hotspot established in any of the brick-and-mortar stores $25_1$-$25_L$ by a corresponding at least one WiFi Access Point 28. In some embodiments, the wireless communication circuitry 230 may further be configured to conduct and facilitate communication with one or more of the position identification devices $26_1$-$26_N$ in any of the brick-and-mortar stores $25_1$-$25_L$. The wireless communication circuitry 230 may illustratively include conventional communication circuitry for conducting and facilitating any such communication, and examples of such conventional communication circuitry include, but are not limited to, one or more conventional radio frequency (RF) transceivers configured to receive and transmit signals at multiple radio frequencies, one or more conventional modem or other communication circuits configured to access and conduct communications via the Internet, and the like. The mobile communication device 16 may illustratively use any suitable communication protocol via the network 14 or other network to communicate with the main server 12, with other cellular and land-based communication devices and/or with one or more of the position identification devices $26_1$-$26_N$ in any of the brick-and-mortar stores $25_1$-$25_L$.

The communication circuitry 210 may, in some embodiments, optionally include conventional near-field communication circuitry 232 as illustrated by dashed-line representation. In such embodiments, the near-field communication circuitry 232 is illustratively configured to communicate with a near-field sensor or interface of another electronic device or system to transfer, upon contact or near-contact therewith, information from the mobile communication device 16 to the other electronic device or system and/or vice versa.

Main Server Environment

Figure 3:
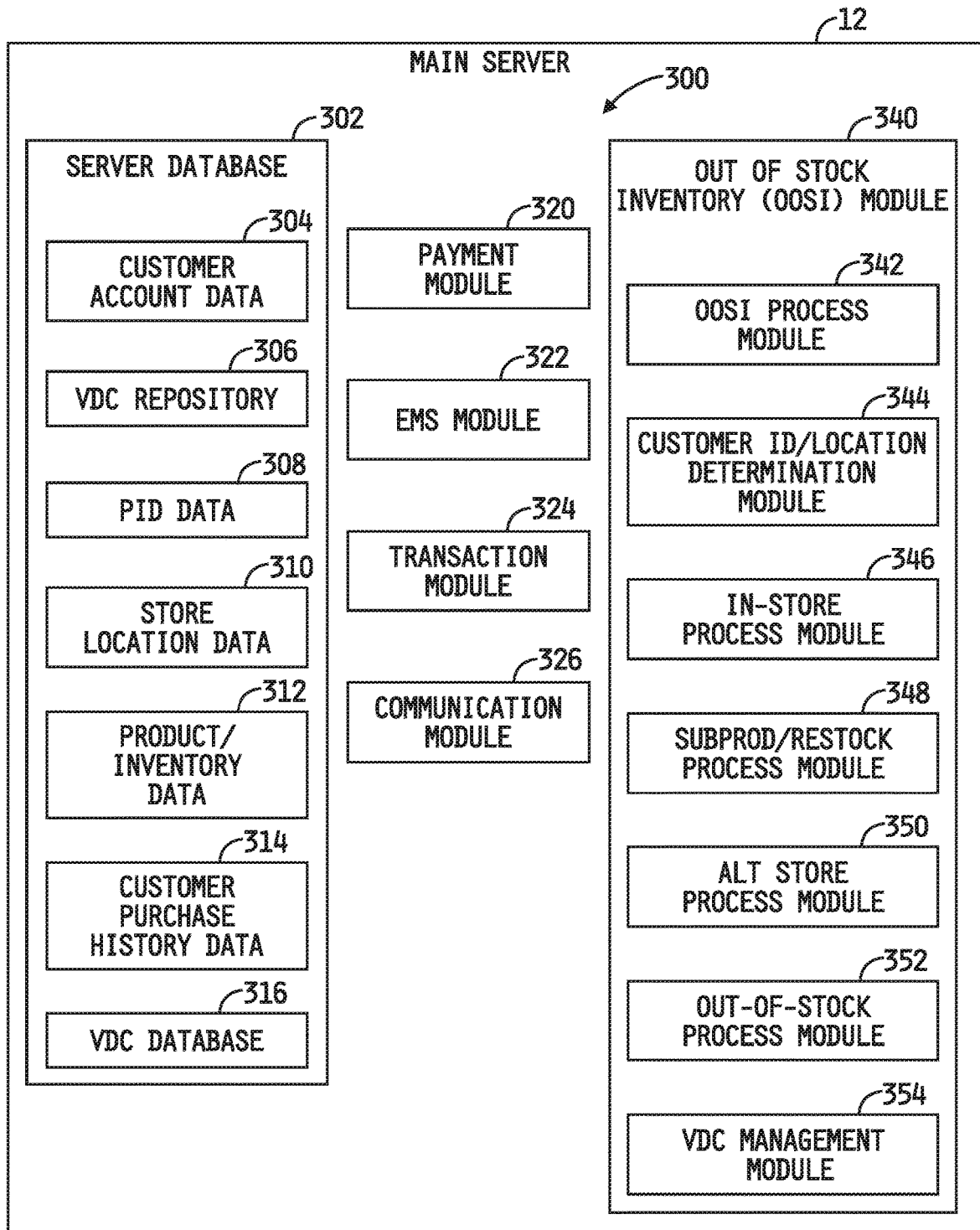
FIG. 3 is a simplified block diagram of an embodiment of example components of the main server of FIG. 1.

Referring now to FIG. 3, a simplified block diagram is shown of an embodiment of an environment 300 of the main server 12 illustrated in FIG. 1. In the embodiment shown in FIG. 3, the environment 300 includes a server database 302 which illustratively includes customer account data 304, a virtual discount coupon (VDC) repository 306, position identification device (PID) data 308, store location data, product/inventory data 312 and, in some embodiments, customer purchase history data 314.

The main server 12 illustratively hosts, manages and maintains an enterprise member or membership services (EMS) program. As used herein, the term "enterprise member services program," "enterprise membership services program" or "EMS" are interchangeable and refer to one or more services offered by the retail enterprise 11 to customer members thereof. Examples of such services may include, but are not limited to, making available to customer members via the main server 12 one or more virtual discount coupons redeemable by the retail enterprise 11, tracking and maintaining with the server 12 of customer purchase histories, i.e., histories of products and/or services purchased by customer members over time, in a customer purchase history database 314, and the like.

In embodiments in which the server 12 offers via the EMS program virtual discount coupons to customer members, the server database 302 may include a virtual discount coupon repository 306 which contains for each customer member a plurality of virtual discount coupons provided to thereto by the server 12 from a virtual discount coupon database 316, and which identifies for each customer member one or more virtual discount coupons which may be selected or "clipped" by the customer member for automatic redemption via the customer virtual discount coupon repository 306 during subsequent qualifying purchases made via one of the POS systems $24_1$-$24_M$. Illustratively, virtual discount coupons stored in the virtual coupon database 316 are, in some embodiments, received from an external source, although in other embodiments the virtual discount coupons stored in the virtual coupon database 316 may alternatively or additionally be generated by the processor 50 of the main server 12. In any case, customer members of the EMS program may redeem such virtual discount coupons stored or identified in the customer's virtual discount coupon repository 306 by presenting such virtual discount coupons at a POS $24_1$-$24_M$ against the purchase of from the retail enterprise 11 of various goods and/or services.

Customers may elect to participate in such an enterprise membership services (EMS) program offered, managed and maintained by the main server 12 of the retail enterprise 11 by establishing a user account within the customer account database 304. In this regard, the terms "customer membership account" and "EMS account" are interchangeable and refer to a collection of information about a customer member of the EMS program that is stored in the customer account data 304 separately from such collections of information about other customer members of the EMS program. In one embodiment, the customer account data 304 of the server database 302 illustratively has stored therein one or more access codes and profile data for each customer member of the EMS program. As customers join the EMS program, the server 12 establishes an EMS account within the customer account data 304 that is unique to the customer, and assigns to the customer, and/or the customer selects, a unique, corresponding enterprise membership services identification code, EMSID. The EMSID associated with each customer is stored by the server 12 along with the customer's profile data in the customer account data 304, and can be used by the customer member thereafter to access the customer's EMS account.

The term "EMS identification code" or EMSID illustratively refers to at least one collection of letters, symbols and/or numbers that is different for, and therefore unique to, each customer member of the enterprise membership services program. The EMSID of each customer member of the EMS program is used by the server 12 to uniquely identify that customer's EMS account in the customer account data 304 of the server database 302. The EMSID is further illustratively used by the server 12 to access information about that customer stored and maintained by the main server 12 in the customer account data 304, to access for redemption one or more virtual coupons selected or "clipped" by the customer and stored in that customer's virtual discount coupon repository 306 in embodiments which include such virtual discount coupons as part of the EMS program, and to also access and/or update that customer's purchase history stored in the customer purchase history data 314. In one example embodiment, the EMSID for each customer member of the EMS program may include a unique, several-digit access code and a separate and unique, several-digit password, although in other embodiments the EMSID may include more, fewer and/or different codes and/or passwords.

The customer account data 304 illustratively further includes additional information relating to the customer members of the EMS program. Examples of such additional information include, but are not limited to, customer name, customer address, digital image of the customer, communication information (CI) of one or more mobile communication devices 16 carried by the customer, and the like. The communication information, CI, of any customer mobile communication device 16 stored in the customer account data 304 may be or include any information via which another communication device or system may establish wireless communications with that mobile communication device 16. In one example embodiment in which the mobile communication device 16 is a mobile phone, the communication information (CI) may be or include the telephone number of the customer's mobile phone 16. In other embodiments, the communication information (CI) may be or include a serial number, electronic identification code or other communication identifier associated with the customer's mobile communication device 16 via which another communication device or system may establish wireless communications with that mobile communication device 16. In any case, all such customer information for each customer member is illustratively associated, i.e., linked or mapped together, in the customer account data 304 such that a search by the server 12 of one customer-specific parameter will provide access to the other customer parameters linked thereto in the customer account data 304. Likewise, the purchase history stored in the customer purchase history data 314 for each customer member of the EMS program is linked or mapped to that customer member's information stored in the customer account data 304 such that a search by the server 12 of any customer-specific parameter in the customer account data 304 will link, and therefore provide access, to that customer's purchase history stored in the customer purchase history data 314 and vice versa.

In some embodiments, the EMSID may be provided on or as part of one or more of a customer ID card, an ID associated with an RFID tag, which RFID tag may be part of NFC communication circuitry 232 of the customer's mobile communication device 16 in embodiments that include such circuitry, a customer's shopping incentive card, or the like. In other embodiments, the EMSID may not be provided in or as part of any tangible form, and may instead be or include one or more easily remembered sequences of numbers, letters, symbols or other characters. In any case, customer members of the EMS program described herein may scan, enter via a keypad or touchscreen or otherwise communicate their EMSID to the server 12 directly or via one of the point-of-sale terminals $24_1$-$24_M$. In some embodiments, for example, when a customer member provides the customer's EMSID to one of the point-of-sale system $24_1$-$24_M$ as part of a purchase transaction (e.g., during the purchase transaction or as part of the process of commencing the purchase transaction), a processor of the point-of-sale system $24_1$-$24_M$ communicates the EMSID to the main server 12 which identifies the customer via the EMSID and associates that customer with the current purchase transaction being carried out at the corresponding point-of-sale system $24_1$-$24_M$. Illustratively, all such purchase transaction data relating to items purchased by such an identified customer during a purchase transaction carried out via one of the point-of-sale system $24_1$-$24_M$ is stored in the customer's purchase history data 314 where it is associated with the identified customer via the customer's EMSID. Illustratively, the purchase transaction data stored in the customer purchase history data 314 may include, but is not limited to, product/service identification information, product/service pricing, product purchase date and time, total quantity of products purchased, total quantity of identical products purchased, total transaction price, and the like, and purchases made by the customer through the retail enterprise 11 are thus monitored and tracked by the main server 12. It is through the customer's EMSID that the main server 12 also makes virtual discount offers available to the customer and that the customer may redeem virtual discount coupons stored or identified in the customer's virtual discount coupon repository 306 against purchases of products and/or services.

The main server 12 illustratively includes an EMS module 322 configured to control and manage customer EMS accounts and EMS-related activity of customer members of the EMS program. In one embodiment, the EMS module 322 manages and controls a customer-member interface, e.g., a web-based interface, to the EMS program via which customers can access and manage their individual EMS accounts stored in the customer account database 304 and via which customers can select or "clip" virtual discount coupons in the virtual discount database 316 for inclusion or identification in the customer's virtual coupon repository 306. Illustratively, each customer may access their individual (and private from other customer-members) EMS account, i.e., their individual EMS page(s) within the web-based EMS interface, which may be referred to herein as an "EMS website" or "EMS web portal," by entering that customer's EMSID into a graphic user interface element of the web-based EMS interface. Therein, the customer may establish, access, modify and otherwise manage the customer's EMS account information including, for example, but not limited to, name, address, email address, mobile telephone number, photograph of the customer or the like.

Illustratively, a software application program is available for download from the main server 12 via the public network 14 for customers electing to access the EMS program via their mobile communication device, e.g., one of the mobile communication devices $16_1$-$16_J$. Once downloaded and activated, shoppers can access and manage their EMS account and program features via the network 14 with the software application program executed by a computing device and/or by a mobile communication device $16_1$-$16_J$ if the latter is equipped with a web browser. Such a software application program is illustratively stored in the EMS module 212 of the customer's mobile communication device 16, as illustrated in FIG. 2, and is executable by the processor 200 of the customer's mobile communication device 16.

As used herein, a "customer membership account" or "EMS account" may in some cases be an individual account accessible only by an individual person, e.g., an individual customer, and in other cases may be a group or "household" account accessible by each of a plurality of members of a predefined group of persons, e.g., members of a family or household, one or more employees of a business enterprise, etc. The terms "member," "customer member," "customer" and "household," and variants thereof, are used interchangeably in the following description, and such terms should be understood to refer interchangeably to an individual customer or a predefined group of individual customers (referred to herein as a "household") who shop at and purchase items from the retail enterprise 11, and who are members of an enterprise membership service (EMS) of the type described herein and provided and managed by the retail enterprise 11, i.e., by the server 12. MPERKS®, a virtual customer coupon collection and redemption program offered to customers by Meijer, Inc. of Grand Rapids, Mich., is an example of one such EMS program of the type described herein, although it will be appreciated that any retail enterprise membership service which offers virtual discount coupons and/or other benefits to customer members, and/or which tracks items purchased by customer members during item purchase transactions at point-of-sale systems or terminals may be alternatively be used.

The position identification device (PID) data 308, in embodiments which include PID data 308, illustratively has stored therein information from which each position identification device $26_1$-$26_N$ in the retail enterprise 11 can be uniquely identified and/or located. In some embodiments, for example, the PID data 308 may include only PID identity information which identifies each particular PID $26_1$-$26_N$ and/or which identifies some aspect, property or characteristic thereof. In other embodiments, the PID data 308 may illustratively include PID location information which identifies a location or position of each PID $26_1$-$26_N$ geographically and/or relative to one or more references positions. In still other embodiments, the PID data 308 may include a combination of any such PID identity information and PID location information.

In embodiments in which the PID data 308 includes PID identity information, such PID identity information may illustratively include a unique identification code (UID) for each PID $26_1$-$26_N$ such that each stored UID value uniquely identifies a different one of the plurality of position identification devices $26_1$-$26_N$. Alternatively or additionally, the PID identity information may include information relating to a property or characteristic of one or more of the PIDs $26_1$-$26_N$ which distinguishes it/them from others of the PIDs $26_1$-$26_N$ (apart from its/their location(s)). Examples of such additional PID identity information may include, but is not limited to, a device type identification code (DTID), a location type identification code (LTID), and the like.

In some embodiments, more than one type of PID may be implemented such that detection techniques used with such types of PIDs differ from detection techniques used with different types of PIDs. In such embodiments, the PID identity information included in the PID data 308 may illustratively include a different device type identification code (DTID) for PIDs $26_1$-$26_N$ of each different device type such that each stored DTID value identifies PIDs $26_1$-$26_N$ of a common type.

In some embodiments, different PIDs of the same or different type may be implemented at or adjacent to common structures or areas at two or more different locations. Examples include PIDs located at each POS system $24_1$-$24_M$ in each of a plurality of different brick-and-mortar stores $25_1$-$25_L$, PIDs of the same type located at each produce scale in each of a plurality of different brick-and-mortar stores $25_1$-$25_L$, a PID located at an entrance/exit (or one or more entrances/exits) of each of a plurality of different brick-and-mortar stores $25_1$-$25_L$, a PID located at a bakery department in each of a plurality of different brick-and-mortar stores $25_1$-$25_L$. Each of the foregoing sub-groups of PIDs share a common location type, e.g., POS PIDs, Produce Scale PIDs, Store entrance PIDs and bakery PIDs respectively, and in such embodiments, the PID identity information included in the PID data 308 may illustratively include location type identification code (LTID) for PIDs $26_1$-$26_N$ located at common locations such that each stored LTID value identifies PIDs $26_1$-$26_N$ of implemented at common locations.

In embodiments in which the PID data 308 includes PID location information, such PID location information may illustratively include information which associates a location or position of one or more PIDs $26_1$-$26_N$ with a geographic location or position and/or with a location or position relative to a reference or known position or location. Examples of such PID location information may include, but are not limited to, a store identification code (SID), a department identification code (DID), a product identification code (PRID) and a specific location identification code (LID).

In some embodiments, multiple PIDs $26_1$-$26_N$ may be implemented at each of a number of geographically separate brick-and-mortar stores $25_1$-$25_L$. In such embodiments PID location information may include a store identification code (SID) for each PID $26_1$-$26_N$ that identifies the one of the plurality of stores $25_1$-$25_L$ in or at which that PID $26_1$-$26_N$ is implemented, such that a group of all PIDs $26_1$-$26_N$ at a common location, i.e., implemented in or at the same store, share the same SID but that groups of PIDs implemented in or at different stores have different SIDs. Similarly, in some embodiments multiple PIDs $26_1$-$26_N$ may be implemented in or at each of a number of different departments within a brick-and-mortar store 25. In such embodiments, PID location information may accordingly include a department identification code (DID) for each PID $26_1$-$26_N$ that identifies the one of a plurality of departments in or at which that PID $26_1$-$26_N$ is implemented, such that a group of all PIDs $26_1$-$26_N$ implemented in or at the same department share the same DID but that groups of PIDs implemented in or at different departments within the same store or in different stores have different DIDs. Likewise, in some embodiments multiple PIDs $26_1$-$26_N$ may be implemented at or near each of a number of different products or product areas within a department and/or within a brick-and-mortar store 25. In such embodiments, PID location information may include a product identification code (PRID) for each PID $26_1$-$26_N$ that identifies the one of a plurality of different products or product areas within a department and/or within a store stores $25_1$-$25_L$ at or near which that PID $26_1$-$26_N$ is implemented, such that a group of all PIDs $26_1$-$26_N$ implemented at or near a set of like products or product areas share the same PRID but that groups of PIDs $26_1$-$26_N$ implemented at or near different sets of like products or product areas have different PRIDs. Finally, in some embodiments, one or more PIDs $26_1$-$26_N$ may be implemented in or at specific or random locations within one or more areas of, or throughout, a brick-and-mortar store 25, and in such embodiments PID location information may include a specific location identification code (LID) for each PID $26_1$-$26_N$ that identifies a specific location, e.g., absolute or relative to one or more other known positions or locations, at or near which that PID $26_1$-$26_N$ is implemented, such that each PID $26_1$-$26_N$ has a different LID.

In embodiments in which the PID data 308 includes multiple PID identity codes and/or multiple PID location codes for one or more of the PIDs $26_1$-$26_N$, such multiple PID identity codes and/or multiple PID location codes for each PID $26_1$-$26_N$ are associated with each other, e.g., linked together, in the PID data 308. Accordingly a search of the PID data 308 for information relating to any one of the PIDs $26_1$-$26_N$ will produce all PID identity code and/or multiple PID codes stored in the PID data 308 for that PID $26_1$-$26_N$. Those skilled in the art will recognize other information that may be included in the PID data 308 from which the identity and/or location of one or more of the PIDs $26_1$-$26_N$ may be determined, and it will be understood that any such other information and any technique for processing any such information to determine the identity/identities of one or more of the PIDs $26_1$-$26_N$ and/or the location(s) of one or more of the PIDs $26_1$-$26_N$ is contemplated by this disclosure.

The store location data 310 in the server database 302 illustratively has stored therein reference location information identifying each of the brick-and-mortar stores $25_1$-$25_L$ of the retail enterprise and a geographic location thereof. In some embodiments, the store location data 310 may include various physical locations within each brick-and-mortar store 25. In some embodiments, the store location data 310 may alternatively or additionally include physical and/or product location information identifying various merchandise areas $30_1$-$30_P$, product display areas, shelving units, shelves or other physical locations within the brick-and-mortar stores. In still other embodiments, the store location data 310 may alternatively or additionally include topographical map, planogram or other such data, some or all of which may be in graphical form, corresponding to one or more locations or areas within each of the brick-and-mortar stores $25_1$-$25_L$.

The product/inventory data 312 illustratively has product identification codes stored therein for each product that the retail establishment offers for sale, and each such stored product identification code is illustratively associated in the database 312 with, i.e., linked to, mapped to or otherwise associated with, stored product information relating to at least the identity of the product, the price of the product, and the present inventory of the product at each of the brick-and-mortar stores $25_1$-$25_L$. In some embodiments, the stored product information may further include information relating to one or more present locations of such product inventory within each of the brick-and-mortar stores $25_1$-$25_L$, past inventory of the product within each of the brick-and-mortar stores $25_1$-$25_L$, future inventory of the product at each of the brick-and-mortar stores $25_1$-$25_L$, e.g., "real" inventory that has been ordered and which the store is presently awaiting delivery and/or "projected" inventory which is expected to be delivered to the store in the future based on past ordering practices or other criteria, dates of delivery of any such past, present and/or future inventory at each of the brick-and-mortar stores $25_1$-$25_L$, and the like.

The environment 300 of the main server 12 further includes a payment module 320, a transaction module 324 and a communication module 326. In one embodiment, the payment module 320 is configured, in a conventional manner, to process tangible forms of electronic payment systems (EPS), e.g., tangible electronic funds transfer instruments such as credit cards, debit cards, etc., used at the point-of-sale systems $24_1$-$24_M$. In an example of such embodiments, the payment interface module 320 illustratively is or includes a conventional magnetic strip reading device configured to read payment information stored in magnetic form on a strip affixed to a conventional credit or debit card. Alternatively or additionally, the payment interface module 320 may be or include an NFC interface, and in such embodiments the NFC interface is configured to access, via contact or near-contact with a mobile communication device 16 having a like-configured NFC device 232, electronically readable customer payment system (EPS) information stored on or accessible by the mobile electronic device 16.

The transaction module 324 is configured to monitor and manage transactions for the purchase of products and services made by customers using any of the point-of-sale systems $24_1$-$24_M$. The communication module 326 is configured, in a conventional manner, to control and manage all communications between the main server 12 and the local hub servers 22 in embodiments that include the local hub servers 22, and to control and manage all communications between the main server 12 and all point-of-sale systems $24_1$-$24_M$, in embodiments that do not include a local hub server 22. The communication module 326 is further configured, in a conventional manner, to control and manage all wireless communications conducted between the main server 12 and the mobile communication devices $16_1$-$16_J$.

Figure 5:
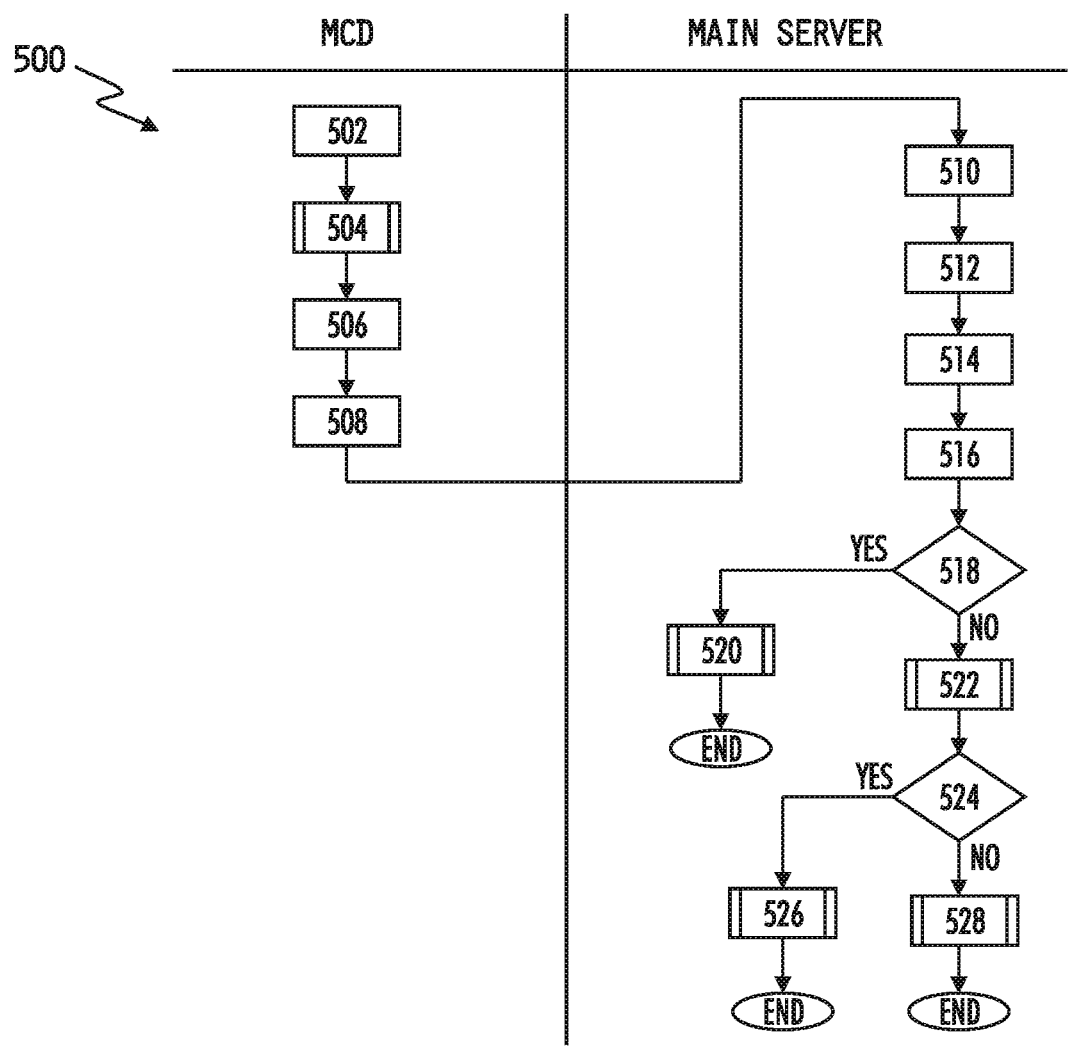
FIG. 5 is a simplified flow diagram of an embodiment of a process for obtaining out-of-stock inventory.

The environment 300 of the main server 12 further illustratively includes an out-of-stock inventory (OSSI) module 340 which illustratively includes an out-of-stock inventory (OOSI) process module 342, a customer identification/location determination module 344, an in-store process module 346, a substitute product/restock process module 348, an alternate store process module 350, an out-of-stock process module 352 and a virtual discount coupon (VDC) management module 354. The OOSI process module 342 is illustratively configured and operable to manage and facilitate identification of an out-of-stock (or low-stock) product selected by a customer carrying a mobile communication device 16 executing the OOSI application 214 stored in the memory 204 thereof, and to manage and facilitate where, how and when to get the selected product to the customer, in-store or otherwise. An example embodiment of a process executed by the OOSI processing module 342 is illustrated in FIG. 5 and such a process will be described in detail hereinafter.

Figure 6A:
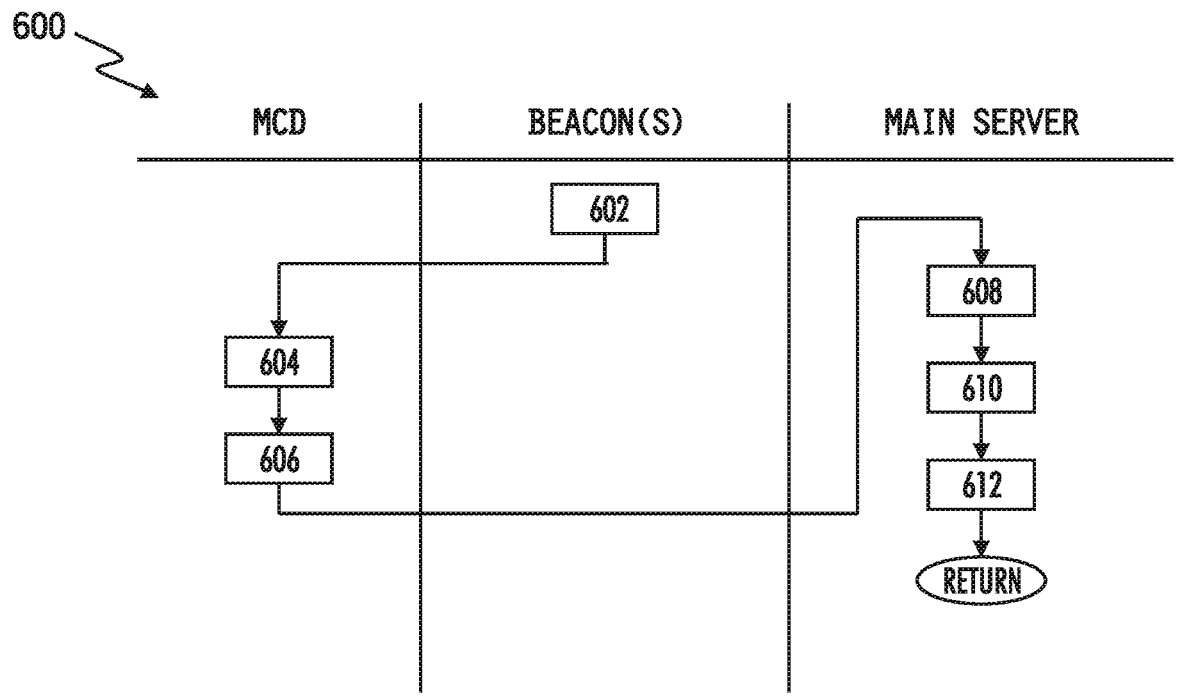
FIG. 6A is a simplified flow diagram of an embodiment of the customer identification/location determination process illustrated in the flow diagram of FIG. 5.
Figure 6B:
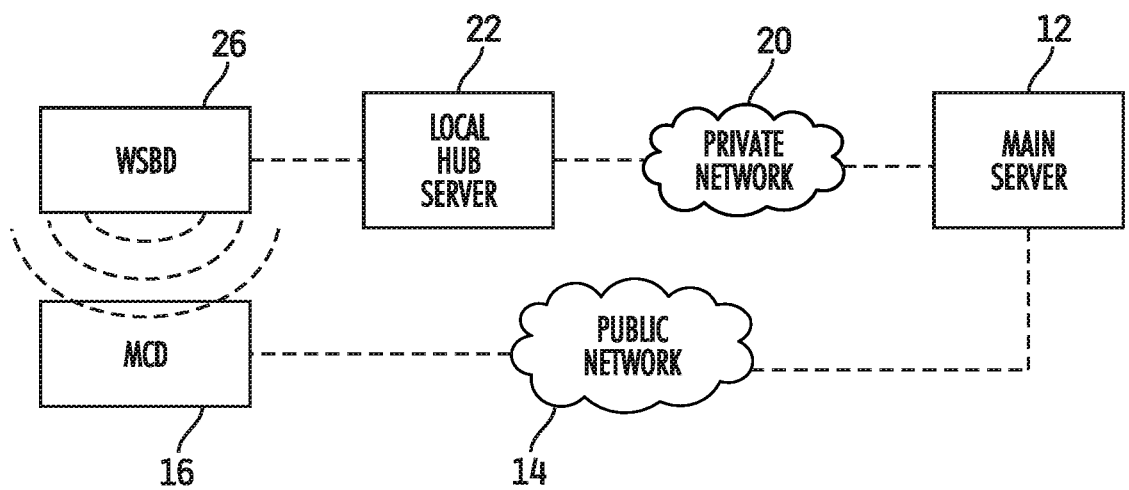
FIG. 6B is a simplified diagram illustrating portions of the process illustrated in FIG. 5.

The customer identification/location determination module 344 is illustratively configured and operable to manage and facilitate determining a location of a mobile communication device 16 executing the OOSI application 214 stored in the memory 204 thereof, and determining an identity of the customer carrying the mobile communication device 16. Example embodiments of processes executed by the customer identification/location determination module 344 are illustrated in FIGS. 6A-6B, and such processes will be described in detail hereinafter.

Figure 8A:
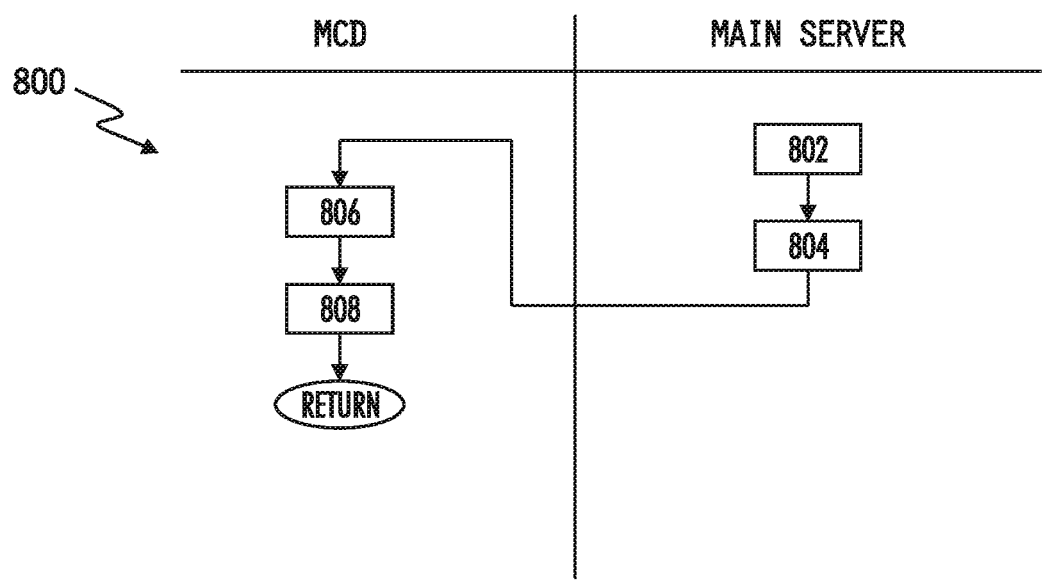
FIG. 8A is a simplified flow diagram of an embodiment of the in-store process illustrated in the flow diagram of FIG. 5.

The in-store process module 346 is illustratively configured and operable to manage and facilitate delivery of the identified product to the customer or direction of the customer to a customer-accessible location of the identified product, when the identified product is determined by the OOSI processing module 342 to be in-stock (and in the desired quantity) in the brick-and-mortar store 25 in which the customer is presently located. An example embodiment of a process executed by the in-store process module 346 is illustrated in FIG. 8A, and such a process will be described in detail hereinafter.

The substitute product/restock process module 348 is illustratively configured and operable to manage and facilitate notification to the customer of expected restocking of the identified product and direction of the customer to an acceptable in-store substitute product, if any, when the identified product is determined by the OOSI processing module 342 to be out-of-stock (and/or in-stock but not in the desired quantity) in the brick-and-mortar store 25 in which the customer is presently located. An example embodiment of a process executed by the substitute product/restock process module 348 is illustrated in FIG. 8B, and such a process will be described in detail hereinafter.

The alternate store process module 350 is illustratively configured and operable to manage and facilitate direction of the customer to an alternate store in which the identified product is in-stock (and in the desired quantity) and notification to the alternate store to hold the identified product for the customer, when the identified product is determined by the OOSI processing module 342 to be out-of-stock (and/or in-stock but not in the desired quantity) in the brick-and-mortar store 25 in which the customer is presently located. An example embodiment of a process executed by the alternate store process module 350 is illustrated in FIG. 9, and such a process will be described in detail hereinafter.

The out-of-stock process module 352 is illustratively configured and operable to direct the customer to a substitute product and, if such a substitute product is declined by the customer, to guide the customer through an ordering process for ordering, for pickup or delivery, of the identified product, when the identified product is determined by the OOSI processing module 342 to be out-of-stock (and/or in-stock but not in the desired quantity) in the brick-and-mortar store 25 in which the customer is presently located and also in nearby brick-and-mortar stores. Example embodiments of processes executed by the out-of-stock process module 352 are illustrated in FIGS. 10 and 11, and such processes will be described in detail hereinafter.

Figure 8B:
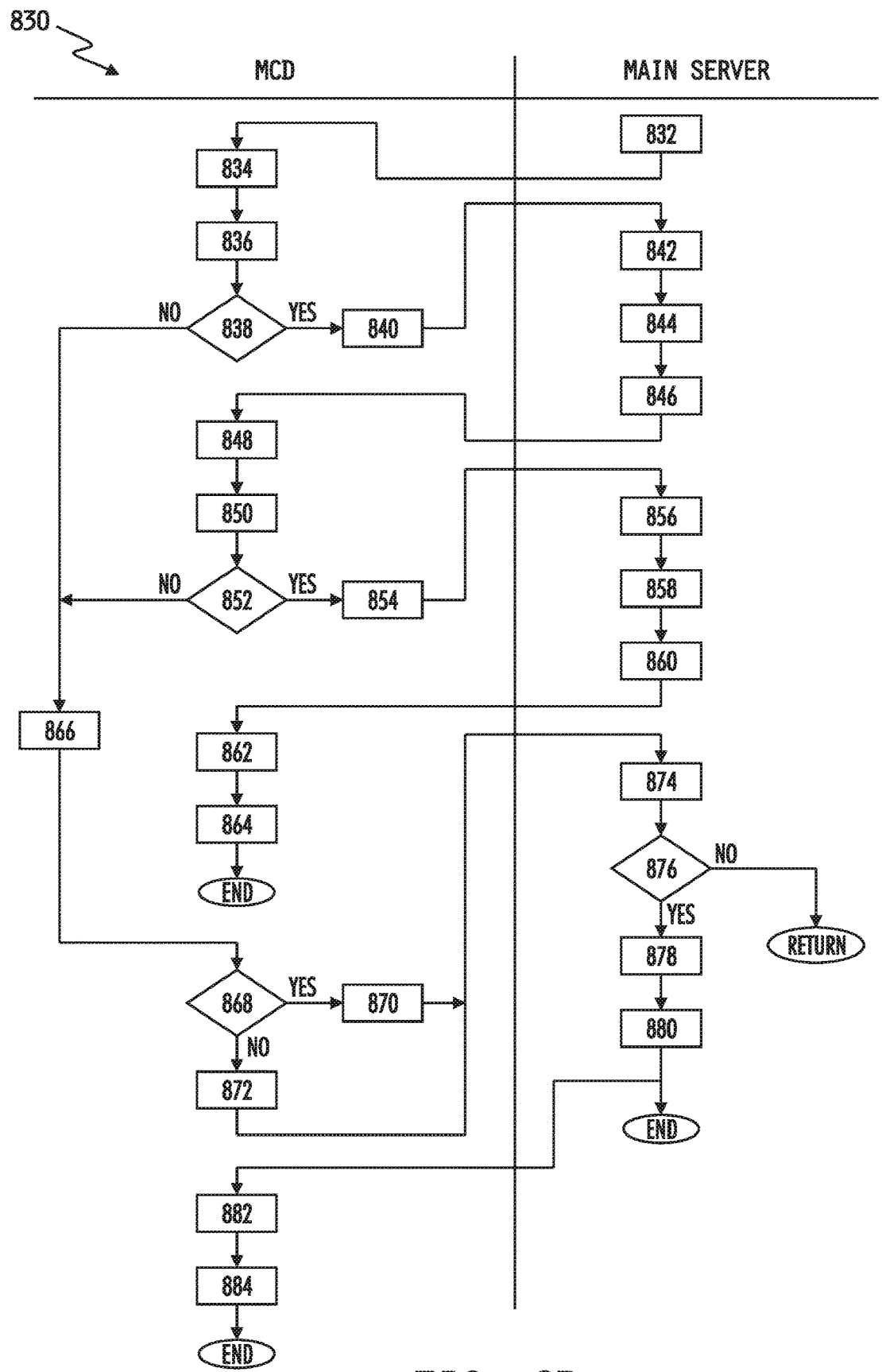
FIG. 8B is a simplified flow diagram of an embodiment of the substitute product/restock process illustrated in the flow diagram of FIG. 5.
Figure 9:
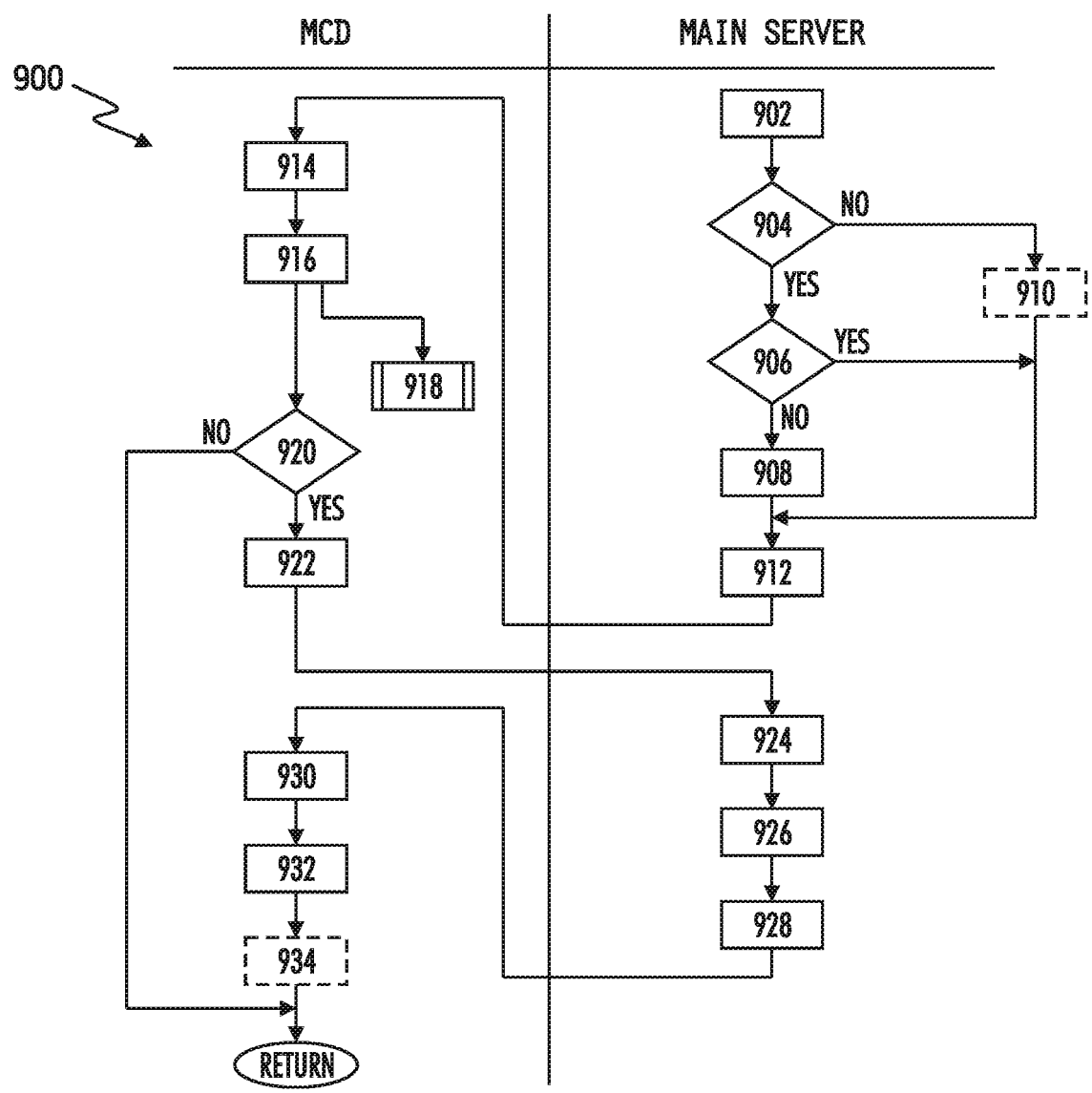
FIG. 9 is a simplified flow diagram of an embodiment of the alternate store process illustrated in the flow diagram of FIG. 5.
Figure 10:
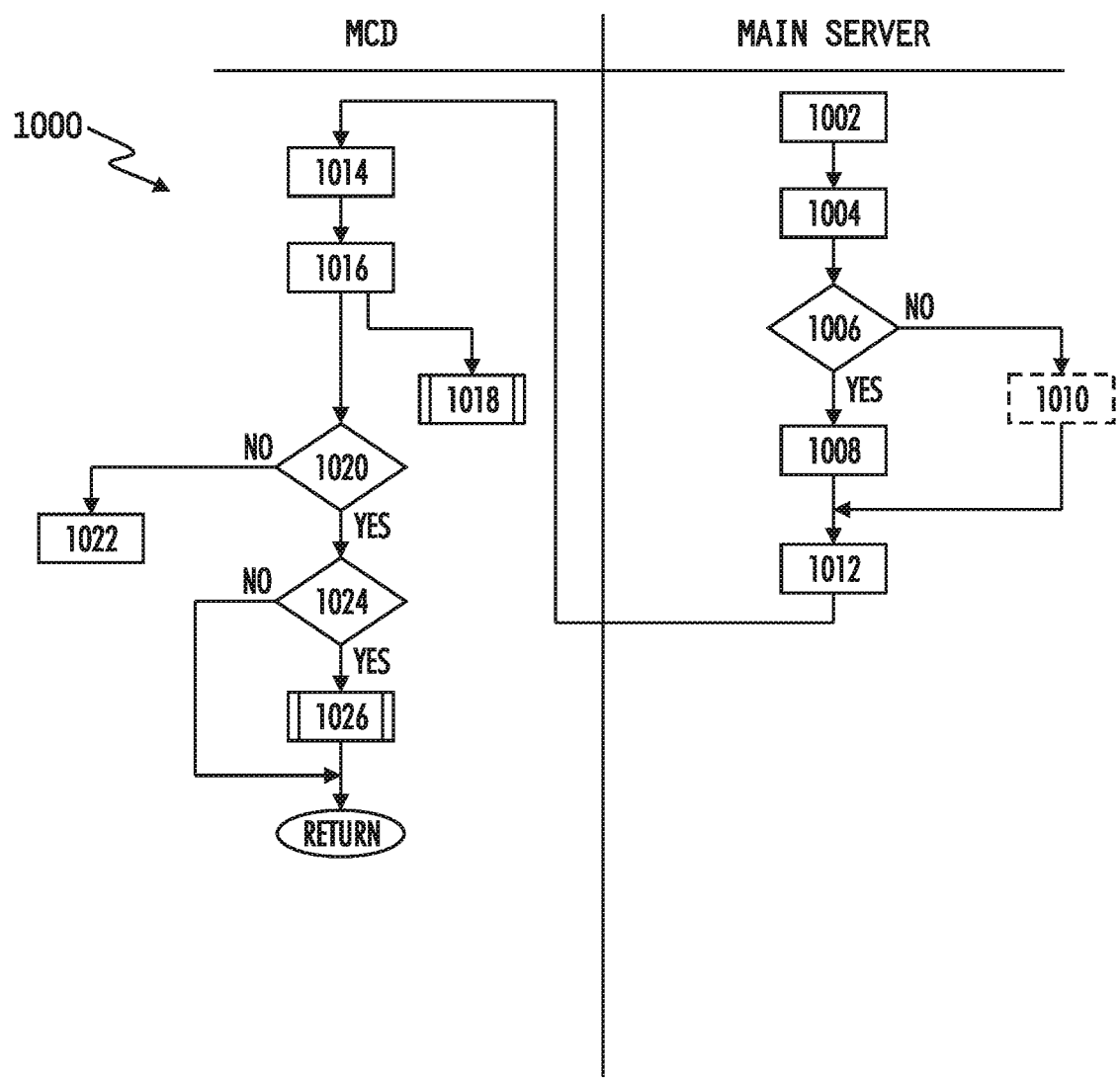
FIG. 10 is a simplified flow diagram of an embodiment of the out-of-stock process illustrated in the flow diagram of FIG. 5.
Figure 11:
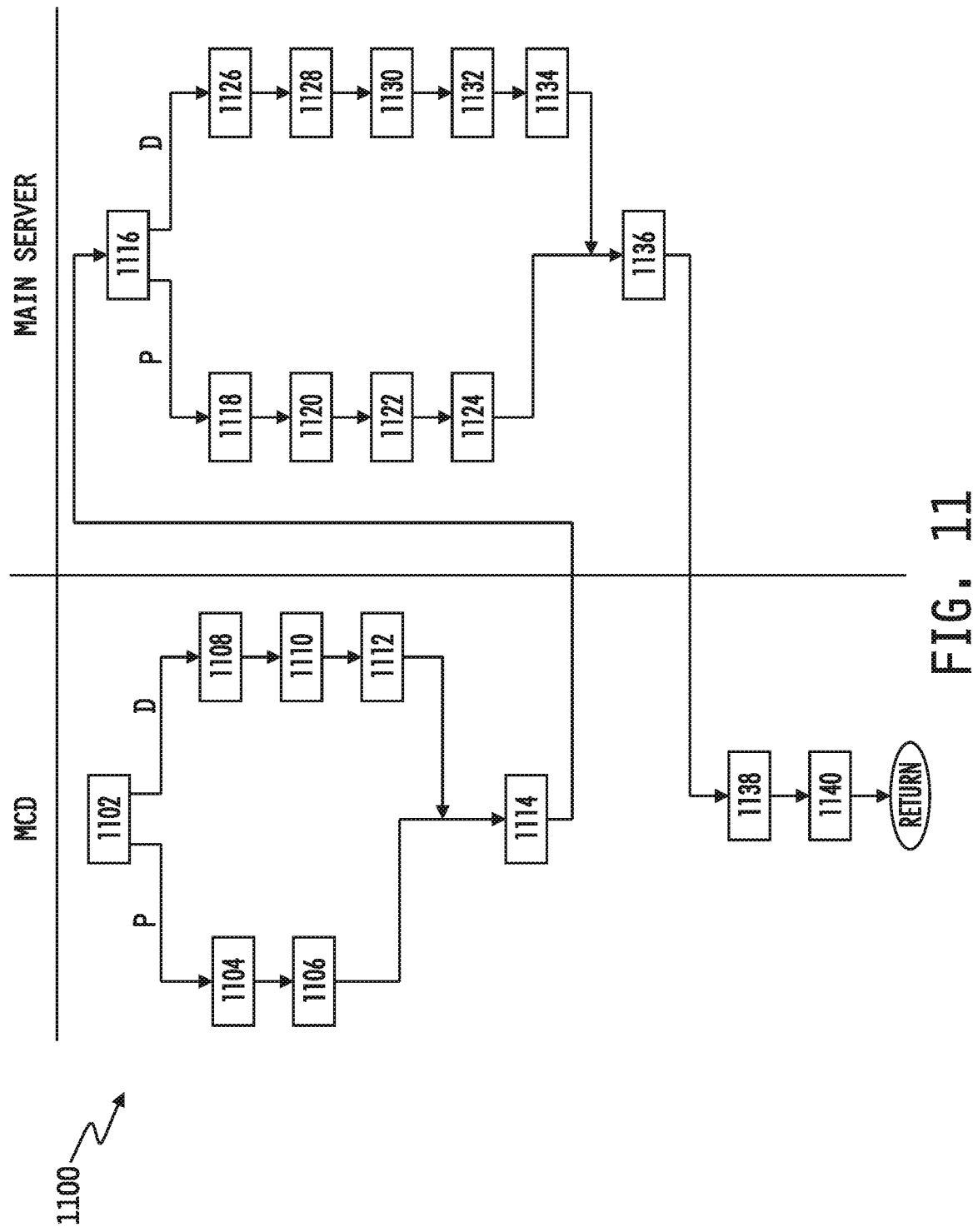
FIG. 11 is a simplified flow diagram of an embodiment of the product order process illustrated in the flow diagram of FIG. 10.

The virtual discount coupon (VDC) management module 354 is illustratively operable, in some embodiments, to generate and/or retrieve from the virtual discount coupon database 316 one or more virtual discount coupons, and to provide such one or more virtual discount coupons to the customer during the various out-of-stock inventory processes illustrated in FIGS. 8B, 9 and 10.

It will be understood that any one or more of the foregoing modules 342-354 may be implemented in hardware, firmware or software (e.g., instructions stored in the memory 54 of the main server 12 and executable by the processor 50), or any combination thereof.

OSSI Process

Figure 4:
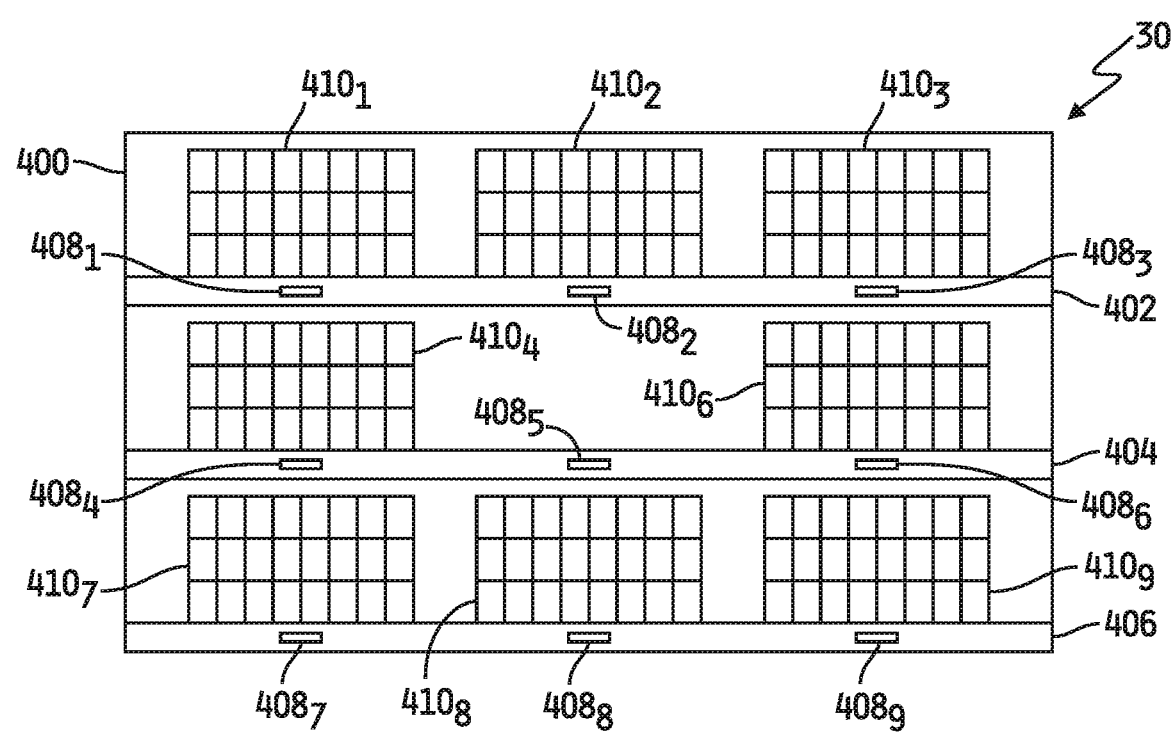
FIG. 4 is a simplified diagram of a shelving and display unit located in a brick-and-mortar store of the retail enterprise, in and on which a number of different items for purchase are stocked.

Referring now to FIG. 4, a simplified diagram is shown of a shelving and display unit 400 located in a merchandise area 30 of one of the brick-and-mortar stores $25_1$-$25_L$ of the retail enterprise 11. In the illustrated embodiment, the shelving and display unit 400 illustratively includes a plurality of vertically-spaced, horizontal shelves 402, 404 and 406 each configured to support various products for display and sale by the brick-and-mortar store 25. Supported on the top shelf 402 are three sets of different products $410_1$, $410_2$ and $410_3$, and attached to a front face of the top shelf 402 are three spaced-apart labels $408_1$, $408_2$ and $408_3$, each positioned below a different one of the sets of different products $410_1$, $410_2$ and $410_3$ and each of which bear a product identification code specific to a corresponding one of the set of products $410_1$, $410_2$ and $410_3$ supported by the shelf 402. The bottom shelf 406 likewise supports three sets of different products $410_7$, $410_8$ and $410_9$, and attached to a front face of the top shelf 406 are three spaced-apart labels $408_7$, $408_8$ and $408_9$, each positioned below a different one of the sets of different products $410_7$, $410_8$ and $410_9$ and each of which bear a product identification code specific to a corresponding one of the set of products $410_7$, $410_8$ and $410_9$ supported by the shelf 406. The middle shelf 404 is likewise configured to support three different sets of products, but illustratively supports only two sets of different products $410_4$ and $410_6$, and like the shelves 402 and 404, three spaced-apart labels $408_4$, $408_5$ and $408_6$ are affixed along the front face of the shelf 404 with the label $408_4$ positioned below the set of products $410_4$ and bearing a product identification code specific to the products in the set of products $410_4$ the label $408_6$ positioned below the set of products $410_6$ and bearing a product identification code specific to the products in the set of products $410_6$ and the label $408_5$ positioned below an empty space on the shelf where a set of products are normally stocked and bearing a product identification code specific to those products.

In one embodiment, the product identification code displayed on each of the shelf labels $408_1$-$408_9$ is or includes a conventional Universal Price Code (UPC), although this disclosure contemplates other embodiments in which the product identification code displayed on one or more of the shelf labels $408_1$-$408_9$ may be or include one or more of a European Article Number or International Article Number (EAN), Electronic Product Code (EPC), GS1 code or other product identification code which uniquely identifies a particular product. In any case, the product identification codes are, in some embodiments, displayed on the shelf labels $408_1$-$408_9$ in the form of conventional linear bar codes, although this disclosure contemplates other embodiments in which one or more of the product identification codes is/are displayed in the form of a two-dimensional matrix code such as a QR code or a GS1 datamatrix, a composite code or other type of code. In any case, the product identification codes are displayed on the labels $408_1$-$408_9$ such that the codes can be captured by conventional product identification code scanning equipment or an image capturing device.

When customers shopping in a brick-and-mortar store $25_1$-$25_L$ encounter an out-of-stock inventory condition such as that illustrated in FIG. 4 in which items normally stocked on the shelf 404 above, and uniquely identified by, the product identification code displayed, affixed or otherwise carried by the label $408_5$, are missing (or stocked a quantity that is less than that desired by the customer), the out-of-stock inventory (OOSI) application 214 stored in the memory 204 of the customer's mobile communication device 16 may be used to locate or order one or more of the out-of-stock inventory items. The OOSI application 214 is illustratively part of an interactive process conducted between a customer's mobile communication device 16 and the main server 12 of the retail enterprise 11 to locate or order out-of-stock inventory items, and an embodiment of such an interactive process 500 is illustrated in FIG. 5.

Referring now to FIG. 5, a simplified flow diagram is shown of an embodiment of a process 500 for obtaining out-of-stock inventory. As indicated by the framework of the process 500 illustrated in FIG. 5, a portion of the process 500, i.e., the portion to the left of central vertical line and centered under the heading "MCD," illustratively represents one or more software applications executed by the processor 200 of a customer's mobile communication device 16, i.e., one of the mobile communication devices $16_1$-$16_J$ associated with a customer of the retail enterprise 11. In one embodiment, this portion of the process 500 is or includes the out-of-stock inventory (OOSI) application module 214 stored in the memory 204 (and/or data storage 206) of the customer's mobile communication device 16 (see FIG. 2) in the form of instructions executable by the processor 200 of the customer's mobile communication device 16. The process steps of this portion of the process 500 will therefore be described below for purposes of this disclosure as being executed by the processor 200 of the customer's mobile communication device 16.

Another portion of the process 500, i.e., the portion to the right of the central vertical in FIG. 5, and centered under the heading "Main Server," illustratively represents one or more software applications executed by the processor 50 of the main server 12. In one embodiment, this portion of the process 500 is stored in the out-of-stock inventory (OOSI)

process module 342 (see FIG. 3) in the form of instructions executable by the processor 50 of the main server 12. The process steps of this portion of the process 500 will be described below for purposes of this disclosure as being executed by the processor 50 of the main server 12. In some alternate embodiments, e.g., that may or may not include a main server 12, this portion of the process 500 may alternatively be stored in the memory 34 (and/or data storage 36) of one or more of the local servers 22 in the form of instructions executable by the processor 32 of the one or more local servers 22, stored in the memory of one of the point-of-sale systems $24_1$-$24_M$ within one or more of the brick-and-mortar enterprise stores $25_1$-$25_L$ in the form of instructions executable by a processor associated with any such point-of-sale system $24_1$-$24_M$ and/or stored in a memory and executable by a processor of another system external to or supplemental to the system 10 illustrated FIG. 1. It will further be understood that portions of the process 500 illustrated as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 500 begins at step 502 where the customer seeking an out-of-stock inventory item, e.g., one or more products normally stocked on the shelf 404 above the label $408_5$ but missing from the shelf 404 in the example illustrated in FIG. 4 (or one or more products stocked on a shelf but in a quantity that is less than that desired by the customer), launches, i.e., activates, the out-of-stock inventory (OOSI) application 214 stored in the memory 204 or data storage 206 of the customer's mobile communication device 16. In some alternate embodiments, the OOSI application 214 may be activated not because the product sought by the customer is out-of-stock or in-stock but in a quantity less than that desired by the customer, but rather because the customer wishes to know the total quantity of a product that the retail enterprise 11 currently has in stock at the retail store 25 in which the customer is presently located or at any of a number of nearby stores. If, for example, the total quantity of the product currently in-stock at the retail store 25 in which the customer is presently located or currently in-stock at any of a number of nearby stores is less than that which the customer desires over a subsequent time frame, the customer may wish to purchase all of the product that the retail enterprise 11 currently has in stock at the retail store 25 in which the customer is presently located and/or currently in stock at any of a number of nearby stores. In such embodiments, information communicated back to the customer's mobile communication device 16 will illustratively include such total quantity and location information for any product identified by the customer pursuant to the OOSI application 214.

Following step 502, the processor 200 of the customer's mobile communication device 16 is operable at step 504, e.g., with or without the assistance of one or more processors of one or more other electronic devices and/or systems, to identify the location of the customer's mobile communication device 16 and the identity of the customer associated with the mobile communication device 16 which activated the OOSI application 214. The location of the customer's mobile communication device 16 illustratively includes the location or identity of the one of the brick-and-mortar stores $25_1$-$25_L$ in which the customer's mobile communication device 16 is currently located, and may further include either or both of the identity or location of the department (e.g., merchandise area 30) of the identified brick-and-mortar store in which the customer's mobile communication device 16 is currently located and the identity or location of a specific area of the identified department or store, e.g., aisle, shelf, product location, department sub-section, such as frozen food area of the grocery department, etc. Various different techniques are contemplated for determining, at step 504, the location of the customer's mobile communication device 16 and the identity of the customer associated with the mobile communication device 16 which activated the OOSI application 214 at step 502, and examples of various embodiments of customer identification/location determination processes are described in detail below with reference to FIGS. 6A-6B.

The process 500 advances from step 504 to step 506 where the processor 200 of the customer's mobile communication device is illustratively operable to control the display 218 to display a message instructing the customer to capture an image of the product identification code associated with the out-of-stock inventory item sought by the customer. In some embodiments, the processor 200 is illustratively operable at step 506 to also automatically activate the on-board camera 222 in preparation of and/or to facilitate capture of the image of the product identification code. In some embodiments, the processor 200 is further illustratively operable at step 506 to execute one or more conventional set of instructions which facilitate capture of the product identification code by the on-board camera 222, e.g., by displaying on the display 218 a window within which to position the produce identification code via the lens of the camera 222, by automatically focusing the lens of the camera 222 on the product identification code captured by the lens and/or by automatically capturing an image of the product identification code upon which the lens of the camera 222 is focused. In other embodiments, capture of the image of the product identification code may be a manual process, or may include one or more manual processes, conducted by the customer using the on-board camera 222.

Figure 7:
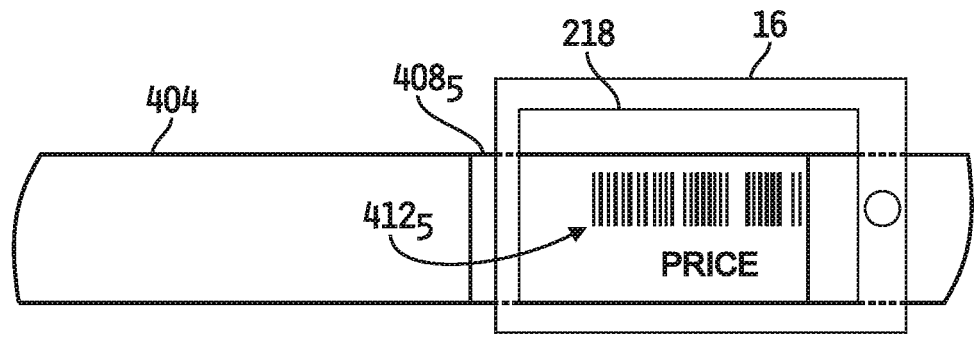
FIG. 7 is a simplified diagram illustrating capture of one of the product identification codes attached to the shelving and display unit illustrated in FIG. 4 by a camera of a customer mobile communication device.

Referring now to FIG. 7, a graphic example of the product identification code capture process of step 506 of the process 500 is shown. In the illustrated example, the customer's mobile communication device 16 is positioned relative to the label $408_5$, affixed to the front of the shelf 404 below the location where the product(s) sought by the customer are typically stocked as illustrated in FIG. 4, such that the product identification code $412_5$ on the label $408_5$ is captured by the lens of the on-board camera 222 and displayed on the display 218 of the device 16. As illustrated in FIG. 7, the label $408_5$ illustratively includes the product identification code $412_5$ in the form of a conventional UPC bar code and further illustratively includes the price, e.g., the retail and/or unit price, of the item. The UPC bar code, or any other such bar code, matrix code or other code, has a product identification code encoded or embedded therein, and the bar code, matrix code or other code is typically read or captured with one or more conventional hardware code capturing devices and processed in a conventional manner to decode or extract the product identification code encoded or embedded therein. The camera 222 of the customer's mobile communication device is one such conventional code capturing device, and with the lens of the camera 222 on-board the device 16 positioned as illustrated in FIG. 7, the on-board camera 222 captures an image of the product identification code $412_5$ as described above. In some embodiments, the product identification code $412_5$ and/or other information on the label $408_5$ may illustratively include product location information, such as one or more of the identity BID of the brick-and-mortar store, the identity of the department DID within the identified brick-and-mortar store and/or the identity of the specific location SID, e.g., the aisle, shelf and/or shelf location, within the identified brick-and-mortar store, at which the desired product is normally stocked.

Referring again to FIG. 5, the processor 200 of the customer's mobile communication device 16 may be operable at step 506, in some alternative embodiments of the process 500, to control the display 218 to display one or more GUI fields with instructions guiding the customer to manually enter the product identification code, e.g., the UPC and/or other information on the label $408_5$, into the one or more GUI fields. In some such embodiments, the processor 200 may be further operable at step 506 to display one or more GUI fields with instructions guiding the customer to manually enter the brick-and-mortar store identity, BID, and/or the location, DID and/or SID. In any case, the process 500 advances from step 506 to step 508 where the processor 200 of the customer's mobile communication device 16 is operable to wirelessly transmit, i.e., to control the communication circuitry 208 to wirelessly transmit, one or more signals to the main server 12. In embodiments in which the customer identification code, CID, and the location of the customer's MCD 16, i.e., the brick-and-mortar store identity, BID, and/or the location, DID and/or SID, were determined and provided to the main server 12 automatically, e.g., such as via the process 600 illustrated in FIGS. 6A-6B and/or one of the various alternate techniques and/or processes described below following the description of the process 600, the one or more signals wirelessly transmitted by the processor 200 at step 508 may carry or contain only the product identification code captured at step 506, e.g., the image of the product identification code or the manually entered product identification code. In other embodiments in which the brick-and-mortar store identity, BID, and/or customer location, DID and/or SID, is included as part of the label $408_5$, the one or more signals wirelessly transmitted by the processor 200 at step 508 illustratively carry or contain only the image of the product identification code captured at step 506 if the captured image contains BID, DID and/or SID, or may carry or contain the captured image or the manually entered product identification code and BID, DID and/or SID. In either case, the one or more signals wirelessly transmitted by the processor 200 at step 508 also carry or contain the customer identification code, CID, stored in the memory 204 or data storage 206 of the device 16.

In some alternative embodiments, the processor 200 of the customer's mobile communication device 16 may be operable at step 506 to process the captured image of the product identification code to identify the encoded or embedded product identification code (and/or BID, DID and/or SID). In any case, the processor 200 is illustratively operable at step 508 to automatically transmit the one or more wireless signals to the main server 12 after the product identification code is captured at step 506, e.g., the image of the product identification code is captured or the product identification code is manually entered into the customer's mobile communication device 16. In other embodiments, the processor 200 may be operable at step 508 to wirelessly transmit the one or more wireless signals to the main server 12 only upon manual selection of one or more buttons, keys or touch-screen elements on the mobile communication device 16, i.e., the processor 200 may be responsive to manual input to the mobile communication device 16 to wirelessly transmit the one or more wireless signals to the main server 12.

The main server 12 receives at step 510 the one or more signals wirelessly transmitted by the customer's MCD 16 at step 508. In embodiments in which the one or more signals wirelessly transmitted by the customer's MCD 16 carry the customer identification code, CID, and store identity information relating to the identity, BID, of the one of the brick-and-mortar stores $25_1$-$25_L$ at which the customer is presently located and, in some embodiments, the customer location information relating to the location, DID and/or SID, of the customer's MCD 16 within an identified brick-and-mortar store as just described, the process includes step 512, and the processor 50 is operable to execute step 512 by processing CID and the brick-and-mortar store identity/MCD location information BID, DID and/or SID to determine the identity of the customer and the identity of the brick-and-mortar store at which the customer is presently located and/or the location of the customer's MCD 16 with an identified brick-and-mortar store, and the process 500 thereafter advances to step 514. In embodiments in which CID and the brick-and-mortar store location, BID, and, in some embodiments, the customer location, DID and/or SID, within a brick-and-mortar store were previously determined by and/or provided to the processor 50, e.g., in embodiments in which step 504 is executed by the process 600 illustrated in FIGS. 6A-6B and/or one of the various alternate techniques and/or processes described below following the description of the process 600, the process step 512 may be omitted or bypassed and the process 500 advances from step 510 to step 514.

At step 514, the processor 50 is illustratively operable to process the image of the product identification code captured at step 506 to determine therefrom the encoded or embedded product identification code. In embodiments in which the processor 200 of the customer's mobile communication device 16 is operable at step 506 to process the captured image of the product identification code to identify the encoded or embedded product identification code, step 514 may be omitted or bypassed. In any case, the processor 50 is thereafter operable at step 516 to search the product/inventory database 312 to locate product information relating to the product identification code. The processor 50 is illustratively operable to execute step 516 by searching the product/inventory database 312 for a product identification code stored therein that matches the product identification code extracted or decoded from the wirelessly received product identification code image (or that matches the wirelessly received product identification code in embodiments in which the processor 200 of the mobile communication device 16 is operable at step 506 to extract or decode the product identification code from the captured image thereof).

If, at step 516, the product identification code extracted or decoded from the product identification code image captured by the camera 222 of the customer's mobile communication device 16 is determined by the processor 50 to match one of the product identification codes stored in the product/inventory database 312, the processor 50 is further operable at step 516 to determine from the product/inventory database 312 where, if at all, the retail enterprise 11 presently has one or more of the product identified by the matching product identification code in inventory. In one embodiment, the processor 50 is operable to execute step 516 by first determining whether the identified brick-and-mortar store has one or more of the identified product in inventory and, if so, the current location(s) thereof within the store. If the identified brick-and-mortar store does not have any of the identified product currently in inventory, the processor 50 is then illustratively operable to further determine whether any of one or more nearby one(s) of the remaining brick-and-mortar stores $25_1$-$25_L$ has/have one or more of the identified product currently in inventory and, if so, the current location(s) thereof within such one or more stores. If no such inventory exists, the processor 50 is illustratively operable to then still further determine whether any of the remaining one(s) of the brick-and-mortar stores $25_1$-$25_L$ has/have one or more of the identified product currently in inventory and, if so, the current location(s) thereof within such remaining one or more stores.

In alternate embodiments, the processor 50 may be operable to execute step 516 by determining the current inventory (i.e., total quantity or quantities) and current location(s) thereof of the identified product within all of the brick-and-mortar stores $25_1$-$25_L$ or within each of a predetermined or customer-selected subset of the brick-and-mortar stores $25_1$-$25_L$. In either case, if the processor 50 determines at step 516 that the identified one of the brick-and-mortar stores $25_1$-$25_L$ does not currently have one or more of the identified product in inventory, the processor 50 may be further operable in some embodiments to search the product/inventory database 312 or other database containing restocking information relating to orders placed, or to be placed, with the vendor(s) of the identified product, ordered quantity, shipping schedules, expected receipt date(s), and the like to determine or estimate a future date and/or time when additional inventory of the identified product will or should be received at the identified brick-and-mortar store and/or be available for customer purchase. In some embodiments, the processor 50 may be operable at step 516 to determine one or more reasons why the identified product is currently out-of-stock, e.g., manufacturing and/or manufacturer problem, vendor problem, delivery problem, etc.

In some embodiments, if the processor 50 determines at step 516 that the identified one of the brick-and-mortar stores $25_1$-$25_L$ does not currently have one or more of the identified product in inventory, the processor 50 may be further operable at step 516 to determine, e.g., by searching the product/inventory database 312, for one or more products that are currently in inventory in the identified brick-and-mortar store and/or in one or more alternate, e.g., nearby, stores, and that may be substituted for the identified product, i.e., one or more substitute products. For each such substitute product identified by the processor 50, the processor 50 may be further operable at step 516 to determine the location(s) thereof in the identified one of the brick-and-mortar stores $25_1$-$25_L$ or, if such a substitute product is not currently in stock at the identified one of the brick-and-mortar stores $25_1$-$25_L$ to determine the location(s) thereof in one or more alternate ones of the brick-and-mortar stores $25_1$-$25_L$. Such a determination may, in some embodiments, take into account only information contained within the product/inventory database 312, and in other embodiments this determination may take into account additional information including, for example, but not limited to, the identified customer's purchase history stored in the customer purchase history data 314 or other data storage location, e.g., the determination may take into account information relating to items previously purchased by the identified customer including, for example, but not limited to, one or more of item brand, quantity purchased, frequency of purchase, item description, item content(s), item size, item category (e.g., produce, canned good, frozen food, etc.), and the like.

In the illustrated embodiment, the process 500 advances from step 516 to step 518 where the processor 50 is illustratively operable to determine, e.g., from the execution of step 516, whether the identified one of the brick-and-mortar stores $25_1$-$25_L$ has one or more of the product identified by the matching product identification code in inventory and, if so, the location(s) thereof within the store. If the processor 50 determines that the identified brick-and-mortar store has one or more of the identified products currently in inventory, the process 500 advances to step 520 where the processor 50 is operable to execute an in-store process in which the main server 12 is operable to manage and facilitate delivery of the product identified by the matching product inventory code to the customer or direction of the customer to a customer-accessible location of the identified product. An example embodiment of such an in-store process is illustrated in FIG. 8A and will be described in detail hereinafter.

If, at step 518 the processor 50 of the main server 12 determines that the identified one of the brick-and-mortar stores $25_1$-$25_L$ does not have the product identified by the matching product identification code currently in inventory, the process 500 advances to step 522 where the processor 50 is illustratively operable to execute a substitute product/restock process to manage and facilitate notification to the customer of expected restocking of the identified product, e.g., to determine whether the identified customer wishes to wait to purchase the identified product until at least one additional shipment of the identified product is received by the identified brick-and-mortar store, and direction of the customer to an acceptable in-store substitute product, if any, e.g., to determine whether the identified customer is interested in purchasing a substitute product that is currently in-stock and available for purchase at the identified brick-and-mortar store. An example embodiment of such a substitute product/restock process is illustrated in FIG. 8B and will be described in detail hereinafter.

If, at step 518, the processor 50 of the main server 12 determines that the identified one of the brick-and-mortar stores $25_1$-$25_L$ does not have the product identified by the matching product identification code currently in inventory, and the customer elects not to await restocking of the identified product or accept a substitute product in accordance with the substitute product/restock process executed at step 522, the process 500 advances to step 524. At step 524, the processor 50 of the main server 12 the processor 50 is illustratively operable to determine, from the search conducted at step 516, whether any nearby one or more of the brick-and-mortar stores $25_1$-$25_L$ presently has/have in inventory one or more of the product identified by the matching product identification code. In one embodiment, the term "nearby" illustratively means within a predefined radius of the identified one of the brick-and-mortar stores $25_1$-$25_L$, e.g., within 5 miles, 10 miles, 15 miles, 25 miles, 50 miles, etc. In some such embodiments, the process 500 may be interactive and include one or more steps executable by the processor 50 and by the processor 200 of the customer's mobile communication device 16 via which the identified customer may specify or select the radius. In some alternative embodiments, "nearby" may mean within the same town, city, township, county, zip code, two or more contiguous towns, cities, townships or zip codes, or the like. In any case, the process 500 illustratively advances from the "YES" branch of step 524 to step 526 where the processor 50 is illustratively operable to execute an alternate store process in which the main server 12 is operable to manage and facilitate direction of the customer to an alternate store in which the identified product is in-stock (and in the desired quantity) and notification to the alternate store to hold the identified product for the customer. An example embodiment of such an alternate store process is illustrated in FIG. 9 and will be described in detail hereinafter.

If, at step 524, the processor 50 of the main server 12 determines that none of the identified nearby ones of the brick-and-mortar stores $25_1$-$25_L$ currently have one or more of the product identified by the matching product identification code in inventory, the process 500 advances to step 528 where the processor 50 is illustratively operable to execute an out-of-stock process in which the main server 12 is operable to direct the customer to a substitute product or, if a substitute product is declined by the customer, to guide the customer through an ordering process for ordering, for pickup or delivery, of the identified product. An example embodiment of such an out-of-stock process is illustrated in FIGS. 10 and 11 and will be described in detail hereinafter.

Customer Identification/Location Determination

Referring now to FIG. 6A, a simplified flow diagram is shown of an embodiment of a brick-and-mortar store identification process 600 executed by the customer's mobile communication device at step 504 of the process 500 illustrated in FIG. 5, i.e., for determining the identity of the one of the brick-and-mortar stores $25_1$-$25_L$ at which the customer's mobile communication device 16 is currently located. The framework of the process 600 illustrated in FIG. 6A is similar to that of FIG. 5 in which a portion of the process 600, i.e., the portion to the left of the left-most vertical line and centered under the heading "MCD," illustratively represents one or more applications executed by the processor 200 of a customer's mobile communication device 16, i.e., one of the mobile communication devices $16_1$-$16_J$ associated with a customer of the retail enterprise 11. In one embodiment, this portion of the process 600 is or includes the OOSI application module 214 stored in the memory 204 (and/or data storage 206) of the customer's mobile communication device 16 in the form of instructions executable by the processor 200 of the customer's mobile communication device 16. The process steps of this portion of the process 600 will be described below for purposes of this disclosure as being executed by the processor 200 of the customer's mobile communication device 16.

Another portion of the process 600, i.e., the portion between the left-most vertical line and the right-most vertical line in FIG. 6A, and centered under the heading "Wireless signal broadcasting device," does not necessarily represent a portion of the process 600 that is stored in a memory of any system or server in the form of instructions executable by a processor, but rather represents operation of the one or more of the position identification devices $26_1$-$26_N$ illustrated and described with respect to FIG. 1.

In some embodiments, the position identification devices $26_1$-$26_N$ are provided in the form of conventional electronic wireless signal broadcasting devices 224, e.g., conventional radio frequency broadcasting beacons, for the purpose of broadcasting radio signals carrying information corresponding to the location and/or identity thereof. For purposes of the following description of the process 600 illustrated in FIG. 6A, the position identification devices $26_1$-$26_N$ will be described with such an implementation, i.e., as wireless signal broadcasting devices $26_1$-$26_N$. It will be understood, however, that this disclosure contemplates other embodiments in which one or more of the position identification devices $26_1$-$26_N$ is/are provided in another form or in other forms. Examples of such other forms will be described at the end of this document.

Yet another portion of the process 600, i.e., the portion to the right of the right-most vertical in FIG. 6A, and centered under the heading "Main Server," illustratively represents one or more software applications executed by the processor 50 of the main server 12. In one embodiment, this portion of the process 600 is stored in the OOSI processing module 342 in the form of instructions executable by the processor 50 of the main server 12. The process steps of this portion of the process 600 will be described below for purposes of this disclosure as being executed by the processor 50 of the main server 12. In some alternate embodiments, e.g., that may or may not include a main server 12, this portion of the process 600 may alternatively be stored in the memory 34 (and/or data storage 36) of one or more of the local servers 22 in the form of instructions executable by the processor 32 of the one or more local servers 22, stored in the memory of one of the point-of-sale systems $24_1$-$24_M$ within one or more of the brick-and-mortar enterprise stores $25_1$-$25_L$ in the form of instructions executable by a processor associated with any such point-of-sale system $24_1$-$24_M$ and/or stored in a memory and executable by a processor of another system external to or supplemental to the system 10 illustrated FIG. 1. It will further be understood that portions of the process 600 illustrated as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

In the process 600 illustrated in FIG. 6A, item 602 illustratively identifies action taken by the one or more wireless signal broadcasting devices 26 positioned at, in, or near one or more of the merchandise areas $30_1$-$30_P$ in any of the brick-and-mortar stores $25_1$-$25_L$ of the retail enterprise 11. In the example illustrated in FIG. 4, the shelving unit 400 is illustratively located in a merchandise area 30, and one or more wireless signal broadcasting devices 26 may illustratively be positioned at or near the shelving unit 400. In some embodiments, each such one or more wireless signal broadcasting devices 26 operate to continuously or continually broadcast wireless identification signals, each of which carry decodable information in the form of a unique identification code (UID) as described hereinabove with respect to FIG. 1.

Illustratively, the wireless signal broadcasting devices 26 in each of the plurality of brick-and-mortar enterprise locations or stores $25_1$-$25_L$ are positioned at various locations throughout the brick-and-mortar location such that each broadcasts wireless signals from a different location within one of the brick-and-mortar locations or stores. As used herein, the phrases "brick-and-mortar enterprise location" and brick-and-mortar store" will be understood to be synonymous. In any case, in some embodiments, the wireless signal broadcasting devices 26 are mounted or placed sequentially in rows and columns within and throughout each brick-and-mortar store $25_1$-$25_L$. In some alternate embodiments, one or more of the wireless signal broadcasting devices 26 is/are positioned at or near one or more of the merchandise areas $30_1$-$30_P$. Each such wireless signal broadcasting device 26 is, in any case, configured to periodically broadcast one or more unique wireless identification signals, i.e., one or more identification signals that distinguish the particular wireless signal broadcasting device 26 from other wireless signal broadcasting devices 26.

In some embodiments, the wireless signal broadcasting devices 26 are each configured to periodically broadcast wireless identification signals in the radio frequency (RF) range, although any of the one or more wireless signal broadcasting devices 26 may be configured to alternatively broadcast wireless identification signals in one or more other frequency ranges. Illustratively, the unique wireless identification signals broadcast by each wireless signal broadcasting device 26 carry decodable information in the form of a unique identification code (UID). Generally, the UID of each wireless signal broadcasting device 26 uniquely identifies that wireless signal broadcasting device and distinguishes that wireless signal broadcasting device from all other wireless signal broadcasting devices within the retail enterprise 11 or at least those located in any one brick-and-mortar store 25. In some embodiments, such signals may be periodically or non-periodically broadcast by the one or more wireless signal broadcasting devices 26 and in other embodiments some such wireless signal broadcasting devices may periodically broadcast wireless signals and others of the wireless signal broadcasting devices may broadcast wireless signals non-periodically. In still other embodiments, one or more such wireless signal broadcasting devices may sometimes periodically broadcast wireless signals and at other times broadcast wireless signals non-periodically.

In any case in embodiments in which such wireless signal broadcasting devices continuously or continually broadcast wireless signals, the process advances to step 604 where the wireless communication circuitry 316 of the customer's mobile communication device 16 is illustratively operable to unique identification signals wirelessly broadcast by any in-range wireless signal broadcasting device 26 at the time of execution of step 604, and in the example illustrated in FIG. 4 and also as illustrated in FIG. 6B, at least one such wireless signal broadcasting device 26 is, for purposes of this description of the process 600, in-range relative to the mobile communication device 16 carried by a customer positioned at the shelving unit 400.

As used herein, the term "in-range" will be understood to refer to one or more of the wireless communication devices 26₁-26ₙ within the broadcast range of which a customer's mobile communication device 16 is presently located. Thus, if in the example illustrated in FIG. 6B the outer-most semi-circular dashed line emanating from the wireless signal broadcasting device 26 represents the broadcast range of the wireless signal broadcasting device 26, the wireless signal broadcasting device 26 is an in-range wireless signal broadcasting device relative to the customer mobile communication device 16. If the customer mobile communication device 16 depicted in the example illustrated in FIG. 6B is moved downwardly such that the outer boundary of the customer mobile communication device 16 is located below the outer-most semi-circular dashed line emanating from the wireless signal broadcasting device 26, the wireless signal broadcasting device 26 is not an in-range wireless signal broadcasting device relative to the customer mobile communication device 16.

In any case, following step 604, the process 600 advances to step 606 where the processor 200 of the customer's mobile communication device 16 is responsive to detection of wireless identification signals broadcast by any in-range wireless signal broadcasting device 26 to transmit one or more wireless signals to the main server 12, e.g., to control the communication circuitry 208 in the device 16 to wirelessly transmit one or more signals to the main server 12 via the public network 14. The one or more wireless signals illustratively contain(s) the unique identification (UID) of an in-range wireless signal broadcasting device as well as a customer identification code, CID, which identifies the customer carrying the mobile communication device 16 and/or which identifies the mobile communication device 16.

In one embodiment, the memory 204 or data storage 206 of the customer's mobile communication device 16 may have stored therein the customer identifier, CID, in the form of an identifier which identifies the customer associated with, i.e., that carries, the mobile communication device 16. In some such embodiments, CID illustratively is or includes the customer's enterprise membership identification code, EMSID, stored in the customer account data 204, or is another code or set of codes to which the EMSID is linked or from which the ESMID can otherwise be determined by the processor 50 of the main server 12. In some alternate embodiments, CID may be or include a customer identification code that is unrelated to the customer's enterprise membership identification code, ESMID. In other alternate embodiments, the memory 204 or data storage 206 of the mobile communication device 16 may have stored therein the customer identifier, CID, in the form of communication information which identifies the mobile communication device 16 for purposes of wirelessly communicating therewith, e.g., a mobile telephone number and/or other communication identifier, which identifies the customer's mobile communication device 16 to the main server 12 for the purpose of communicating information from the main server 12 back to the customer's mobile communication device 16. In such embodiments, the customer account data 204 illustratively includes such communication information for each customer which has the OOSI application 214 stored in a mobile communication device 16 carried by the customer, and in some embodiments the customer account data 204 includes such communication information for each customer-member of the EMS program. In any case, such communication information is illustratively linked to or otherwise associated with one or more data components in the customer's customer account information stored in the customer account data 304 such that the processor 50 can search the customer account data 304 by communication information to locate the customer's communication information and identify the customer by customer information associated therewith in the customer account data 304. In any case, the customer's mobile communication device 16 is operable, at step 606, to transmit to the main server 12 a customer identification, CID, whether in the form of an identifier of the customer, such as the customer's EMSID or other identifier, or in the form of an identifier of the customer's mobile communication device 16, such as the communication information of the customer's mobile communication device 16. Those skilled in the art will recognize other customer identifiers which may be stored in the customer's mobile communication device 16 and which may be wirelessly transmitted by the customer's mobile communication device 16 at step 606.

In one embodiment, the processor 200 of the customer's mobile communication device 16 is further operable at step 604 to process the wireless identification signals broadcast by an in-range one of the wireless signal broadcasting devices 26 to determine therefrom the UID of the in-range wireless signal broadcasting device, and to include the UID thereof in the one or more wireless signals transmitted by the customer's mobile communication device 16 to the main server 12 at step 606. In other embodiments, the processor 200 may be operable at step 604 to include in the one or more wireless signals transmitted by the customer's mobile communication device 16 to the main server 12 at step 606 only the raw signal content of the detected wireless identification signals. In such embodiments, the processor 50 of the main server 12 may be operable to thereafter process the raw signal content transmitted thereto by the customer's mobile communication device 16 to determine therefrom the UID of a corresponding in-range wireless signal broadcasting device.

Following step 606, the main server 12 is operable at step 608 to receive the one or more wireless signals transmitted by the customer's mobile communication device 16 at step 606, and the processor 50 of the main server 12 is thereafter operable at step 610 to process the UID contained therein to determine the identity of the in-range one of the wireless signal broadcasting devices whose wirelessly broadcast identification signals were detected by the customer's mobile communication device 16 at step 604, and to also determine the location of the detected wireless signal broadcasting device. The wireless signal broadcasting device location may be, for example, the location of the brick-and-mortar store $25_1$-$25_L$ in which the detected wireless signal broadcasting device is located and/or the location of the detected wireless signal broadcasting device relative to a particular structure or location within a particular brick-and-mortar store $25_1$-$25_L$.

As described briefly above with respect to FIG. 3, the wireless signal broadcasting device database 308 illustratively has stored therein wireless signal broadcasting device identity information for each wireless signal broadcasting device in the retail enterprise 11, and such wireless signal broadcasting device identity information illustratively includes information from which the processor 50 can determine, for each such wireless signal broadcasting device, the identity of the brick-and-mortar store $25_1$-$25_L$ at which each such wireless signal broadcasting device is located, and/or the relative location or position of that wireless signal broadcasting device within an identified brick-and-mortar store $25_1$-$25_L$. Illustratively, the wireless signal broadcasting device identity information stored in the wireless signal broadcasting device database 308 includes at least the UIDs for each of the wireless signal broadcasting devices in the retail enterprise 11. In some embodiments, each such UID may further include or be associated with, e.g., linked to, mapped to, or otherwise identified in the wireless signal broadcasting device database 308 with, a brick-and-mortar store identifier (BMID), e.g., in the form of a designation number or code, which identifies the corresponding one of the brick-and-mortar stores $25_1$-$25_L$ of the retail enterprise in which the corresponding wireless signal broadcasting device 26 is located. The brick-and-mortar location identifiers, BMID, in embodiments which include such brick-and-mortar store identifiers, are illustratively stored in the form of store numbers or codes, such as store 3 or store S6. In other embodiments, the brick-and-mortar location identifiers may include additional information such as city, state or country identifier or the like. Those skilled in the art will recognize other techniques and/or codes that may be used to identify such brick-and-mortar locations where particular wireless signal broadcasting devices are located, and it will be understood that any such other techniques and/or codes are contemplated by this disclosure.

In some embodiments, each such UID may alternatively or additionally include or be associated with, e.g., linked to, mapped to, or otherwise identified in the wireless signal broadcasting device database 308 with a wireless signal broadcasting device location identifier (BID), e.g., in the form of a designation code or other identifier which identifies a location or position of the corresponding wireless signal broadcasting device relative to a reference position and/or structure within all brick-and-mortar stores $25_1$-$25_L$, e.g., in embodiments in which all such brick-and-mortar stores $25_1$-$25_L$ are identically configured, or which identifies a location or position of the corresponding wireless signal broadcasting device relative to a reference position and/or structure within a particular one of the brick-and-mortar enterprise stores $25_1$-$25_L$. In some embodiments of the latter case, the BID may include one or more codes or other identifiers which identify both the particular one of the brick-and-mortar stores $25_1$-$25_L$ in which the wireless signal broadcasting device in located and a location or position within the identified brick-and-mortar store $25_1$-$25_L$. In other embodiments in which the UID is associated with a BMID and a BID, the BID may include one or more codes or other identifiers which identify the position or location of the wireless signal broadcasting device within the brick-and-mortar store identified by BMID. In any case, the wireless signal broadcasting device location identifiers, BID, are, in some embodiments, illustratively stored in the form of location coordinates relative to a base or reference set of coordinates. In some alternate embodiments, the wireless signal broadcasting device location identifiers, BID, may be stored in the form of one or more location codes identifying one or more of an aisle, shelf, merchandise section, merchandise area and/or other identifier which identifies a particular location or position within all or an identified one of the plurality of brick-and-mortar stores $25_1$-$25_L$. As one specific example in which a wireless signal broadcasting device 26 is located at or near the shelving unit 400 of the merchandise area 30 illustrated in the example of FIG. 4, the BID may be S400. As another specific example in which BMID and BID are combined in to a single code and in which a wireless signal broadcasting device 26 is located at or near the shelving unit 400 of the merchandise area 30 illustrated in the example of FIG. 4, the combined BMID-BID may be 30S400.

It will be understood that the wireless signal broadcasting device identity information stored in the wireless signal broadcasting device database 308 may include separately stored but associated values or codes for UID and any one or combination of BMID and BID, or may be one or more codes or identifiers which include UID and any one or combination of BMID and/or BID. Those skilled in the art will recognize other techniques and combinations for identifying and storing the wireless signal broadcasting device identity information stored in the wireless signal broadcasting device database 308, and it will be understood that this disclosure contemplates any technique(s) or combination(s) of information from which the identity and/or location of a wireless signal broadcasting device can be determined by the processor 50 based on a UID wirelessly transmitted by the customer's mobile communication device 16 at step 606 and received by the main server 12 at step 608.

In any of the foregoing embodiments, the processor 50 is illustratively operable at step 610 to process a UID wirelessly received from the customer's mobile communication device 16 by searching for a corresponding UID stored in the wireless signal broadcasting device database 308 or other database that matches the wirelessly received UID. The processor 50 further illustratively operable at step 610 to identify the wireless signal broadcasting device location information, e.g., BMID and/or BID, associated in the wireless signal broadcasting device database 308 or other database with the matching UID.

In some alternate embodiments, the process steps 604-610 just described may be replaced by steps in which the memory 204 and/or data storage 206 of the customer's mobile communication device 16 illustratively has wireless signal broadcasting device information stored therein, e.g., as part of the OOSI application 214, which relates to some or each of the various wireless signal broadcasting devices 26 in one or more of the brick-and-mortar stores $25_1\text{-}25_L$ of the retail enterprise 11. In such embodiments, the processor 200 of the customer's mobile communication device 16 may be operable to process the UID information received from the wireless signal broadcasting device 26 to determine the location of the customer's mobile communication device 16, e.g., as one of the brick-and-mortar stores $25_1\text{-}25_L$ and/or as a location within and relative to one of the brick-and-mortar stores $25_1\text{-}25_L$, as described above with respect to step 610. Those skilled in the art will recognize that any modifications to the process 600 required to implement such alternative steps would be a mechanical step for a skilled programmer, and it will therefore be understood that such an alternative process falls within the scope of this disclosure.

In any case, the process 600 advances from step 610 to step 612 where the processor 50 is illustratively operable to determine whether the CID code transmitted to the main server 12 by the customer's mobile communication device 16 matches a CID code stored in one or more databases, i.e., whether the CID code matches a corresponding CID code stored in the customer account data 304 or other database. The processor 50 is illustratively operable to execute step 612 of the process 600 by searching for the CID code in the customer account data 304 in embodiments in which the CID codes are stored in the customer accounts data 304, or in one or more other databases in which CID codes are stored in embodiments in which the CID codes are stored in such one or more other databases. Following execution of step 612, the process 600 returns to step 504 of the process 500 with the identity, CID, of the customer carrying the mobile communication device 16 and with the location of the customer's mobile communication device, e.g., as the one of the brick-and-mortar stores $25_1\text{-}25_L$ in which the customer's mobile communication device 16 is currently located and/or as the location of the customer's mobile communication device relative to an identified one of the brick-and-mortar stores $25_1\text{-}25_L$ in which the customer's mobile communication device 16 is currently located.

In some embodiments, one or more of the brick-and-mortar stores $25_1\text{-}25_L$ may implement one or more WiFi access points 28 for the purpose of providing, facilitating or enhancing wireless communication access by customer mobile communication devices $16_1\text{-}16_J$ to the public network 14. In some alternate embodiments of the process 600 in which the brick-and-mortar store in which a customer's mobile communication device 16 is presently located has implemented such one or more WiFi access points 28, the processor 200 of the customer's mobile communication device 16 may be operable to recall the customer identification code, CID, from the memory 204 or data storage 206, which is thereafter transmitted by the mobile communication device 16 to the main server 12. In such embodiments, the wireless transmission from the customer's mobile communication device 16 will typically carry an identifier of the hotspot(s) created by the one or more WiFi access points 28 used at the brick-and-mortar store $25_1\text{-}25_L$ to provide, facilitate or enhance wireless communication access to the public network 14, and in such embodiments the processor 50 may accordingly be operable to identify the one of the brick-and-mortar stores $25_1\text{-}25_L$ at which the customer's mobile communication device 16 is currently located by processing the identifier carried by the wireless transmission to identify the brick-and-mortar store. In some such embodiments, the store location database 310 may include information stored therein that associates, e.g., links or maps, local or wide area network identifiers to corresponding ones of the brick-and-mortar stores $25_1\text{-}25_L$, and in such embodiments the processor 50 may be operable to identify the one of the brick-and-mortar stores $25_1\text{-}25_L$ in which the customer's mobile communication device 16 is presently located by comparing the WiFi hotspot identifier carried by the wireless signal(s) received with local or wide area network identifiers stored in the store location database 310 and to identify the brick-and-mortar store associated with a matching one of the stored local or network identifiers as the one of the brick-and-mortar stores $25_1\text{-}25_L$ in which the customer's mobile communication device 16 is presently located.

Referring again to FIG. 5, the processor 320 may be operable in still other embodiments of the process 500 to determine the location of the customer's mobile communication device 16 by controlling the display 218 to display a message or graphic user interface (GUI) requesting or prompting the customer to enter an identifier of the one of the brick-and-mortar stores $25_1\text{-}25_L$ at which the customer's mobile communication device 16 is presently located. In some such embodiments, the processor may control the display 218 to produce a data field into which the customer manually enters, e.g., via a key pad or touch-screen key pad, an identifier of the one of the brick-and-mortar store $25_1\text{-}25_L$ in which the customer is presently located. In such embodiments, the identifier may be a postal address of the brick-and-mortar store or identification code which identifies the appropriate one of the brick-and-mortar stores. In other embodiments, the processor 200 may control the display 218 to display a menu of store identifier options from which the customer may make a manual selection. Such a menu of store identifier options may illustratively be stored in the memory 204 or data storage 206, or may be accessed by the customer's mobile communication device 16 from the store location database 310 of the server database 302.

Those skilled in the art will recognize other techniques for determining the location of the customer's mobile communication device 16, e.g., as the one of the brick-and-mortar stores $25_1\text{-}25_L$ in which the customer's mobile communication device is presently located and/or as a position or location of the customer's mobile communication device within an identified one of the brick-and-mortar stores $25_1\text{-}25_L$, and it will be understood that any such other techniques are contemplated by this disclosure.

In-Store Process

Referring now to FIG. 8A, a simplified flow diagram is shown of an embodiment 800 of the in-store process executed at step 520 of the process 500 illustrated in FIG. 5. The framework of the process 800 illustrated in FIG. 8 is identical to that illustrated in FIGS. 5 and 6B, and the portion of the process 800 centered under the heading "MCD," illustratively represents one or more software applications executed by the processor 200 of a customer's mobile communication device 16, i.e., one of the mobile communication devices $16_1\text{-}16_K$ associated with a customer of the retail enterprise 11, and the portion centered under the heading "Main Server" illustratively represents one or more software applications executed by the processor 50 of the main server 12. In one embodiment, the left portion of the process 800 is or includes the OOSI application module 214 stored in the memory 204 (and/or data storage 206) of the customer's mobile communication device 16 in the form of instructions executable by the processor 200 of the customer's mobile communication device 16. The process steps of this portion of the process 800 will be described below for purposes of this disclosure as being executed by the processor 200 of the customer's mobile communication device 16. The right portion of the process 800 is illustratively stored in the in-store process module 346 in the form of instructions executable by the processor 50 of the main server 12. The process steps of this portion of the process 800 will be described below for purposes of this disclosure as being executed by the processor 50 of the main server 12. In some alternate embodiments, e.g., that may or may not include a main server 12, this portion of the process 800 may alternatively be stored in the memory 34 (and/or data storage 36) of one or more of the local servers 22 in the form of instructions executable by the processor 32 of the one or more local servers 22, stored in the memory of one of the point-of-sale systems $24_1$-$24_M$ within one or more of the brick-and-mortar enterprise stores $25_1$-$25_L$ in the form of instructions executable by a processor associated with any such point-of-sale system $24_1$-$24_M$ and/or stored in a memory and executable by a processor of another system external to or supplemental to the system 10 illustrated FIG. 1. It will further be understood that portions of the process 800 illustrated as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 800 begins at step 802 where the processor 50 of the main server 12 is illustratively operable to transmit one or more signals to the identified one of the brick-and-mortar stores $25_1$-$25_L$ carrying at least one message relating to the product identified by the matching product identification code. The process 800 is illustratively executed when the processor 50 has determined that, while the product identified by the matching product identification code may be absent from a corresponding one of the merchandise areas $30_1$-$30_P$ of the identified one of the brick-and-mortar stores $25_1$-$25_L$, e.g., absent from the shelf 404 in an area thereof above the label $408_5$ as illustrated in the example of FIG. 4, or otherwise be present in a quantity less than that desired by the customer, the identified one of the brick-and-mortar stores $25_1$-$25_L$ nevertheless presently has some, or more, of the identified product on hand in one or more locations within the identified one of the brick-and-mortar stores $25_1$-$25_L$. In such cases in which the processor 50 has determined that the identified one of the brick-and-mortar stores $25_1$-$25_L$ presently has some of the identified product on hand in one or more customer inaccessible storage locations within the identified one of the brick-and-mortar stores $25_1$-$25_L$, e.g., in one or more product stock rooms or other employee-only accessible storage location(s), the processor 50 is illustratively operable at step 802 to transmit at least one message to the identified one of the brick-and-mortar stores $25_1$-$25_L$ instructing delivery of at least one of the identified products to a particular location within the identified one of the brick-and-mortar stores $25_1$-$25_L$. In embodiments in which the location of the customer's mobile communication device 16 is limited to the identity of the one of the brick-and-mortar stores $25_1$-$25_L$ in which the customer's mobile communication device 16 is presently located, the particular location identified in the at least one message transmitted by the processor 50 at step 802 is illustratively the location in the identified one of the brick-and-mortar stores $25_1$-$25_L$ where the identified product would normally be stocked, e.g., the shelf 404 or shelving unit 400 in the example illustrated in FIG. 7. In other embodiments in which the location of the customer's mobile communication device 16 within the identified one of the brick-and-mortar stores $25_1$-$25_L$ has been determined, the particular location identified in the at least one message transmitted by the processor 50 at step 802 may illustratively be the location in the identified one of the brick-and-mortar stores $25_1$-$25_L$ of the customer's mobile communication device 16. In alternative embodiments in which the location of the customer's mobile communication device 16 within the identified one of the brick-and-mortar stores $25_1$-$25_L$ is known or in which the location of the customer's mobile communication device is limited to one of the brick-and-mortar stores $25_1$-$25_L$ in which the customer's mobile communication device 16 is presently located, the particular location may be a pre-designated pickup location within the identified one of the brick-and-mortar stores $25_1$-$25_L$ or one or more other identifiable locations within the identified one of the brick-and-mortar stores $25_1$-$25_L$. In any case, the processor 50 is illustratively operable to execute step 802, in one embodiment, by transmitting at least one such message to any system or device within or otherwise associated with the identified one of the brick-and-mortar stores $25_1$-$25_L$, e.g., the local hub server 22, one or more of the point-of-sale systems $24_1$-$24_M$, any system or device located in or near one or more of the merchandise areas $30_1$-$30_P$ in the identified one of the brick-and-mortar stores $25_1$-$25_L$ and/or other system or device located in the identified one of the brick-and-mortar stores $25_1$-$25_L$. In some alternate embodiments, the processor 50 may illustratively be operable to execute step 802 by transmitting at least one such message to one or more mobile communication devices associated with, e.g., typically carried by, one or more employees of the retail enterprise 11 generally, and in particular to one or more mobile communication devices associate with one or more employees of the retail enterprise 11 assigned to and/or presently located at the identified one of the brick-and-mortar stores $25_1$-$25_L$.

The process 800 advances from step 802 to step 804 where the processor 50 of the main server 12 is operable to also wirelessly transmit one or more signals to the identified customer's mobile communication device 16 carrying at least one message relating to the product identified by the matching product identification code. In one embodiment, the at least one message illustratively includes a notification that the item sought by the identified customer is presently in stock at the identified one of the brick-and-mortar stores $25_1$-$25_L$, or is in stock in a greater quantity than that currently present on the shelf 404 or other location in which the identified product is typically found. In cases in which the processor 50 has determined that the identified one of the brick-and-mortar stores $25_1$-$25_L$ presently has some of the identified product on hand in one or more customer inaccessible storage locations within the identified one of the brick-and-mortar stores $25_1$-$25_L$, e.g., the at least one message may further illustratively include a notification that one or more such items are being delivered by a store employee to the particular located described above.

In other cases, the processor 50 may have determined at step 516 that the identified one of the brick-and-mortar stores $25_1$-$25_L$ presently has some of the identified product on hand, and that such product is located in one or more customer-accessible locations of the identified brick-and-mortar store other than the one of the merchandise areas $30_1$-$30_P$ at or within which it is normally located, e.g., other than the shelf 404 in an area thereof above the label $408_5$ as illustrated in the example of FIG. 4. In such cases, one or more of the identified products may be located in, on or at, for example, one or more temporary merchandise areas, one or more promotional or reduced-price areas, e.g., at an end of one or more shopping isles, one or more clearance areas, or the like. In cases in which the processor 50 determines that the identified one of the brick-and-mortar stores $25_1$-$25_L$ presently has some of the identified product, or an additional quantity of the identified product, on hand and located in such one or more alternate, customer-accessible areas of the store, step 802 may be omitted or bypassed, and the at least one message wirelessly transmitted by the main server 12 to the identified customer's mobile communication device 16 may illustratively include an identification of the one or more alternate, customer-accessible areas of the store at which the identified product is presently located. In some embodiments, the at least one message may further include textual and/or graphic directions to one or more such locations.

Following step 804, the identified customer's mobile communication device 16 receives, at step 806, the one or more messages wirelessly transmitted by the main server 12 at step 804, and at step 808 the processor 200 of the identified customer's mobile communication device 16 is illustratively operable to control the display 218 to display the one or more received messages. Following step 808, the process 800 is complete and the process 800 returns to step 520 of the process 500 illustrated in FIG. 5.

Substitute Product/Restock Process

Referring now to FIG. 8B, a simplified flow diagram is shown of an embodiment 830 of the substitute product/restock process executed at step 522 of the process 500 illustrated in FIG. 5. The framework of the process 830 illustrated in FIG. 8 is identical to that illustrated in FIGS. 5 and 6B, and the portion of the process 830 centered under the heading "MCD," illustratively represents one or more software applications executed by the processor 200 of a customer's mobile communication device 16, i.e., one of the mobile communication devices $16_1$-$16_J$ associated with a customer of the retail enterprise 11, and the portion centered under the heading "Main Server" illustratively represents one or more software applications executed by the processor 50 of the main server 12. In one embodiment, the left portion of the process 830 is or includes the OOSI application module 214 stored in the memory 204 (and/or data storage 206) of the customer's mobile communication device 16 in the form of instructions executable by the processor 200 of the customer's mobile communication device 16. The process steps of this portion of the process 830 will be described below for purposes of this disclosure as being executed by the processor 200 of the customer's mobile communication device 16. The right portion of the process 830 is illustratively stored in the substitute product/restock process module 348 in the form of instructions executable by the processor 50 of the main server 12. The process steps of this portion of the process 830 will be described below for purposes of this disclosure as being executed by the processor 50 of the main server 12. In some alternate embodiments, e.g., that may or may not include a main server 12, this portion of the process 830 may alternatively be stored in the memory 34 (and/or data storage 36) of one or more of the local servers 22 in the form of instructions executable by the processor 32 of the one or more local servers 22, stored in the memory of one of the point-of-sale systems $24_1$-$24_M$ within one or more of the brick-and-mortar enterprise stores $25_1$-$25_L$ in the form of instructions executable by a processor associated with any such point-of-sale system $24_1$-$24_M$ and/or stored in a memory and executable by a processor of another system external to or supplemental to the system 10 illustrated FIG. 1. It will further be understood that portions of the process 830 illustrated as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 830 begins at step 832 where the processor 50 of the main server 12 is illustratively operable to transmit one or more signals to the identified customer's mobile communication device 16 carrying at least one message relating to the product identified by the matching product identification code. Thereafter at step 834, the customer's mobile communication device 16 receives the at least one message transmitted by the main server 12, and at step 836 the processor 200 is operable to control the display 218 of the customer's mobile communication device 16 to display the message. The process 830 is illustratively executed when the processor 50 has determined that the identified product sought by the identified customer is not presently in stock at the identified one of the brick-and-mortar stores $25_1$-$25_L$, or is in stock but not in the quantity desired by the customer. In one embodiment, the at least one message thus illustratively includes a notification that the product sought by the identified customer is not presently in stock at the identified one of the brick-and-mortar stores $25_1$-$25_L$, or is in stock but not in the quantity desired by the customer. The at least one message may further include one or more reasons why the identified product is currently out-of-stock, e.g., manufacturing and/or manufacturer problem, vendor problem, delivery problem, etc., in embodiments of the process 500 in which such information is determined by the server 12. The at least one message further illustratively includes a notification that one or more substitute products may be available along with a number of customer-selectable GUI elements or fields with instructions guiding the customer to select an appropriate one of the GUI elements or fields to accept or decline identification of one or more possible substitute products.

Following step 836, the processor 200 is operable to determine whether the customer has accepted or declined identification by the server 12 of one or more possible substitute products. If the processor 200 determines that the customer has accepted, the process 830 advances to step 840 where the processor 200 controls the communication circuitry 230 to wirelessly transmit one or more corresponding signals to the server 12. Thereafter at step 842, the server 12 receives the one or more signals and at step 844 the processor 50 retrieves the list one or more substitute products, if any, determined by the processor 50 at step 516 of the process 500 illustrated in FIG. 5. At step 846, the processor 50 controls the communication circuitry 58 to wirelessly transmit to the customer's mobile communication device 16 one or more signals carrying the substitute product list or, in cases where the processor 50 was unable at step 516 to determine any suitable substitute products, a message indicating that no substitute products were found.

At step 848, the customer's mobile communication device 16 receives the one or more wirelessly transmitted signals, and at step 850 the processor 200 is operable to control the display 218 to display the one or more substitute products determined by the server 12 at step 516 of the process 500 or, in cases where the processor 50 was unable at step 516 to determine any suitable substitute products, to display the message indicating that no substitute products were found. In some embodiments in which the one or more signals transmitted by the server 12 at step 846 carry multiple substitute products, the processor 200 is operable at step 850 to control the display 218 to display such multiple substitute products in the form of one or more lists of substitute products. In some such embodiments, the processor 200 is further operable to control the display 218 to display the multiple substitute products in the form of a menu of selectable substitute products. In some such embodiments, the processor 200 is further operable to control the display 218 to highlight one of the substitute products, e.g., the "best" or closest match to the identified product. In any case, the processor 200 is further illustratively operable at step 850 to control the display 218 to display selectable GUI elements or fields with instructions guiding the customer to select one of the displayed substitute products in cases where multiple substitute products are displayed, to select the single displayed substitute product in cases where only a single such substitute product is displayed, or to decline selection of the one or any of the displayed substitute products. If, at step 850, only the message is displayed indicating that no substitute products were found, the processor 200 may be further operable at step 850 to display a selectable GUI element or field with instructions guiding the customer to select the GUI element or field to acknowledge the message, or may instead be operable to display the message for only a predetermined time period, and then automatically advance to step 866 or to bypass step 852 and combine steps 850 and 866.

In cases where step 852 is not bypassed, the process 830 advances from step 850 to step 852 where the processor 200 is operable to determine whether the customer has selected the sole displayed substitute product in cases where only one such substitute product is displayed at step 850, whether the customer has selected one of multiple substitute products displayed at step 850 or whether the customer has declined any substitute products. In embodiments in which the processor 50 of the server 12 is operable at step 516 of the process 500 to determine in-store location(s) of the one or more substitute products, the process 830 may include a number of additional steps 854-864, and in such cases where the customer has selected a substitute product displayed at step 850 the process 830 advances to step 854. In other embodiments in which the processor 50 is not operable at step 516 to determine the in-store location(s) of the one or more substitute products, steps 854-864 may be omitted and the process 850 may advance from step 852 to the end of step 864 in cases where the customer has selected a substitute product at step 850. Alternatively, the process 830 may include an alternate set of steps which offer the customer an option of determining the location(s) of the selected substitute product, and then providing the customer with information which guides the customer to the location(s) of the selected substitute product as set forth in steps 854-864.

In embodiments which include steps 854-864, the process 830 advances from step 852 to step 854 when the customer has selected a substitute product. At step 854, the processor 200 is operable to control the communication circuitry 230 to wirelessly transmit to the server 12 one or more signals carrying the selected substitute product, i.e., the substitute product selected at step 850. Thereafter at step 856, the server 12 receives the one or more wireless signals, and thereafter at step 858 the processor 50 of the server 12 is operable to determine, e.g., from the search conducted at step 516 of the process 500, the location(s) within the identified one of the brick-and-mortar stores $25_1$-$25_L$ wherein the substitute product can be found. At step 860, the processor 50 is operable to control the communication circuitry 58 to wirelessly transmit to the customer's mobile communication device 16 one or more signals carrying the substitute product location(s). In some embodiments, the one or more signals may further include textual and/or graphic directions to one or more such locations.

At step 862, the customer's mobile communication device receives the one or more signals, and thereafter at step 864 the processor 200 is operable to control the display 218 to display the location(s) within the identified one of the brick-and-mortar stores $25_1$-$25_L$ wherein the substitute product can be found. In embodiments in which the one or more signals received from the server 12 include textual and/or graphic directions to one or more such locations, the processor 200 is further operable at step 864 to control the display 218 to display such textual and/or graphic directions. Following step 864, the process 830 terminates, which also illustratively terminates the process 500.

If, at step 838 or step 852 the processor 200 determines that the customer has declined at step 836 or step 850 respectively a listing or selection of one or more substitute products, the process 830 advances to step 866. The at least one message wirelessly transmitted by the server 12 at step 832 further illustratively includes a notification of an offer by the server 12 to provide restocking information, i.e., information relating to restocking of the identified product at the identified one of the brick-and-mortar stores $25_1$-$25_L$, along with a number of customer-selectable GUI elements or fields with instructions guiding the customer to select an appropriate one of the GUI elements or fields to accept or decline the offer to provide restocking information. The processor 200 is operable at step 866 to display such a notification, selectable GUI elements or fields and corresponding instructions, and thereafter at step 868 the processor 200 is operable to determine whether the customer has selected one of the GUI elements or fields to accept or decline the restocking information. If the processor 200 determines at step 868 that the customer has accepted the restocking information, the processor 200 is operable at step 870 to wirelessly transmit to the server 12 one or more signals carrying an indication of such acceptance. Otherwise, the processor is operable at step 872 to transmit to the server 12 one or more signals carrying an indication of the customer's decline of the restocking information.

At step 874, the server 12 receives the one or more signals transmitted by the customer's mobile communication device 16 at step 870 or at step 872, and thereafter at step 876 the processor 50 of the sever 12 is operable to determine from the received signals whether or not the customer desires to receive the restocking information. If so, the process 830 advances from step 876 to step 878, and otherwise the process 830 returns to the process 500 illustrated in FIG. 5.

As step 878, the processor 50 of the server 12 is operable to determine the restocking information from the search conducted at step 516 of the process 500, and thereafter at step 800 the processor 50 is operable to control the communication circuitry 58 to wirelessly transmit to the customer's mobile communication device 16 one or more signals carrying the restocking information. At step 882, the customer's mobile communication device 16 receives the one or more signals, and thereafter at step 884 the processor 200 of the customer's mobile communication device 16 is operable to control the display 218 to display the restocking information. Following step 884, the process 830 terminates, which also illustratively terminates the process 500.

Alternate Store Process

Referring now to FIG. 9, a simplified flow diagram is shown of an embodiment 900 of the alternate store process 900 executed at step 526 of the process 500 illustrated in FIG. 5. The framework of the process 900 illustrated in FIG. 9 is identical to that illustrated in FIGS. 5, 6B and 8A-8B, and the portion of the process 900 centered under the heading "MCD," illustratively represents one or more software applications executed by the processor 200 of a customer's mobile communication device 16, i.e., one of the mobile communication devices $16_1$-$16_J$ associated with a customer of the retail enterprise 11, and the portion centered under the heading "Main Server" illustratively represents one or more software applications executed by the processor 50 of the main server 12. In one embodiment, the left portion of the process 900 is or includes the OOSI application module 214 stored in the memory 204 (and/or data storage 206) of the customer's mobile communication device 16 in the form of instructions executable by the processor 200 of the customer's mobile communication device 16. The process steps of this portion of the process 900 will be described below for purposes of this disclosure as being executed by the processor 200 of the customer's mobile communication device 16. The right portion of the process 900 is illustratively stored in the alternate store process module 350 in the form of instructions executable by the processor 50 of the main server 12. The process steps of this portion of the process 900 will be described below for purposes of this disclosure as being executed by the processor 50 of the main server 12. In some alternate embodiments, e.g., that may or may not include a main server 12, this portion of the process 900 may alternatively be stored in the memory 34 (and/or data storage 36) of one or more of the local servers 22 in the form of instructions executable by the processor 32 of the one or more local servers 22, stored in the memory of one of the point-of-sale systems $24_1$-$24_M$ within one or more of the brick-and-mortar enterprise stores $25_1$-$25_L$ in the form of instructions executable by a processor associated with any such point-of-sale system $24_1$-$24_M$ and/or stored in a memory and executable by a processor of another system external to or supplemental to the system 10 illustrated FIG. 1. It will further be understood that portions of the process 900 illustrated as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 900 begins at step 902 where the processor 50 of the main server 12 is illustratively operable to generate a list of the nearby ones of the brick-and-mortar stores $25_1$-$25_L$ which presently have in inventory, i.e., in stock, one or more of the product identified by the matching one of the product identification codes. Thereafter at step 904, the processor 50 is illustratively operable to determine whether the product identified by the matching product identification code is presently discounted, i.e., "on-sale," at the identified one of the brick-and-mortar stores $25_1$-$25_L$, i.e., at the one of the brick-and-mortar stores $25_1$-$25_L$ at which the identified customer is presently located. If not, the process 900 is optionally operable at step 910, as indicated by the dashed-line box 910, to generate a virtual discount coupon for the product identified by the matching one of the product identification codes or retrieve a previously generated virtual discount coupon for the product from the virtual discount coupon (VDC) database 316. In embodiments which do not include the optional step 910, the process 900 advances from the "NO" branch of step 904 to step 912.

If, at step 904, the processor 50 determines that the product identified by the matching product identification code is presently discounted, i.e., "on-sale," at the identified one of the brick-and-mortar stores $25_1$-$25_L$, i.e., at the one of the brick-and-mortar stores $25_1$-$25_L$ at which the identified customer is presently located, the process 900 advances to step 906 where the processor 50 is illustratively operable to determine whether the product identified by the matching product identification code is presently discounted at the brick-and-mortar stores $25_1$-$25_L$ in the list generated at step 902. If so, the process 900 advances to step 912, and otherwise the process 900 advances to step 908 where the processor 50 is illustratively operable to generate a virtual discount coupon for the product identified by the matching one of the product identification codes or retrieve a previously generated virtual discount coupon for the product from the virtual discount coupon (VDC) database 316. In one embodiment, the discount amount of the virtual discount coupon generated or retrieved at step 908 is illustratively equivalent to the discounted amount of the product at the identified one of the brick-and-mortar stores $25_1$-$25_L$ such that, if redeemed at one of the brick-and-mortar stores $25_1$-$25_L$ in the generated list, the customer will receive the same discount as if the product had been available at, and was purchased by the customer from, the identified one of the brick-and-mortar stores $25_1$-$25_L$. In some alternative embodiments, the discount amount of the virtual discount coupon generated or retrieved at step 908 may be greater than the discounted amount of the product at the identified one of the brick-and-mortar stores $25_1$-$25_L$ such that, if redeemed at one of the brick-and-mortar stores $25_1$-$25_L$ in the generated list, the customer will receive a greater discount than if the product had been available at, and was purchased by the customer from, the identified one of the brick-and-mortar stores $25_1$-$25_L$.

In any case, the process 900 advances from step 908 and from the "YES" branch of step 906 and from step 910 (or from the "NO" branch of step 904 if the process 900 does not include step 910) to step 912 where the processor 50 is illustratively operable to wirelessly transmit one or more signals to the identified customer's mobile communication device 16 carrying at least one message relating to the product identified by the matching product identification code. In one embodiment, the at least one message wirelessly transmitted at step 912 illustratively includes a notification that the item sought by the identified customer is not presently in stock at the identified one of the brick-and-mortar stores $25_1$-$25_L$. Alternatively or additionally, the at least one message may illustratively include a notification that one or more such items are presently in-stock and available at a nearby one of the brick-and-mortar stores $25_1$-$25_L$. Alternatively or additionally still, the at least one message may illustratively include an identification of one or more of the brick-and-mortar stores $25_1$-$25_L$ in the list of brick-and-mortar stores $25_1$-$25_L$ generated at step 902. In some such embodiments, the at least one message may further illustratively include information identifying location(s) of one or more of the brick-and-mortar stores $25_1$-$25_L$ included in the at least one message.

At step 914, the identified customer's mobile communication device 16 receives the one or more messages wirelessly transmitted by the main server 12 at step 912, and at step 916 the processor 200 of the identified customer's mobile communication device 16 is illustratively operable to control the display 218 to display at least one of the one or more wirelessly receive messages. In embodiments in which at least one message received from the main server 12 at step 914 includes a virtual discount coupon, the processor 200 is illustratively operable to control the display 218 to display the virtual discount coupon. Illustratively, the processor 200 is further operable at step 918 to execute a conventional virtual discount coupon "clipping" process via which the identified customer may manually select the displayed virtual discount coupon to store the virtual discount coupon in the memory 204 or data storage 206 of the mobile communication device 16 and/or to store the displayed virtual discount coupon in the customer's virtual discount coupon repository the VDC repository 314 of the server database 302.

In embodiments in which at least one message received from the main server 12 at step 914 includes a list of one or more of the brick-and-mortar stores $25_1$-$25_L$ in the list generated by the processor 50 of the main server 12 at step 902, the processor 200 is further illustratively operable at step 916 to display the wirelessly received list, e.g. in list form or in the form of a selectable menu of alternate brick-and-mortar stores $25_1$-$25_L$ which presently have in stock one or more of the products identified by the matching product identification code. In such embodiments, the process 900 also advances from step 916 to step 920 where the processor 200 is illustratively operable to determine whether the one of the alternate brick-and-mortar stores $25_1$-$25_L$ displayed on the display 218 has been manually selected. If not, the process 900 terminates as illustrated in FIG. 9 and returns to step 526 of the process 500 illustrated in FIG. 5, and otherwise the processor 200 is operable at step 922 to control the communication circuitry 208 to wirelessly transmit one or more signals to the main server which contain(s) an identification of the customer-selected one of the list of alternate brick-and-mortar stores $25_1$-$25_L$ displayed on the display 218 at step 916. By selecting such an alternate brick-and-mortar store $25_1$-$25_L$ at step 920, the customer notifies the main server 12 that the identified customer wishes to purchase one or more of the products identified by the matching one of the product identification codes from the alternate brick-and-mortar store $25_1$-$25_L$ selected by the customer.

At step 924, the processor 50 of the main server 12 receives the one or more signals wirelessly transmitted by the identified customer's mobile communication device 16, and thereafter at step 926 the processor 50 is operable to transmit one or more signals to the alternate brick-and-mortar store $25_1$-$25_L$ carrying at least one message relating to the product identified by the matching product identification code. In one embodiment, the at least one message carries a notification of the identified customer's selection of the alternate brick-and-mortar store $25_1$-$25_L$ for purchase of the product identified by the matching product identification code. The at least one message may additionally include instructions to dispatch a store employee to locate the product identified by the matching product identification code within the selected alternate brick-and-mortar store, and to hold the located product for subsequent purchase by the identified customer at the selected alternate brick-and-mortar store. The processor 50 is illustratively operable to execute step 926 in one embodiment by transmitting at least one such message to any system or device within or otherwise associated with the selected alternate one of the brick-and-mortar stores $25_1$-$25_L$, e.g., the local hub server 22, one or more of the point-of-sale systems $24_1$-$24_M$, any system or device located in or near one or more of the merchandise areas $30_1$-$30_P$ in the selected alternate one of the brick-and-mortar stores $25_1$-$25_L$ and/or other system or device located in the selected alternate one of the brick-and-mortar stores $25_1$-$25_L$. In some alternate embodiments, the processor 50 may illustratively be operable to execute step 926 by transmitting at least one such message to one or more mobile communication devices of one or more employees of the retail enterprise 11 generally, and in particular to one or more mobile communication devices of one or more employees of the retail enterprise 11 assigned to and/or presently located at the selected alternate one of the brick-and-mortar stores $25_1$-$25_L$.

In any case, the process 900 advances from step 926 to step 928 where the processor 50 is operable to wirelessly transmit one or more signals to the identified customer's mobile communication device 16 illustratively carrying a confirmation message including at least one notification confirming the identified customer's selection at step 920 of the alternate one of the brick-and-mortar stores $25_1$-$25_L$ from which the customer wishes to purchase the product identified by the matching one of the product identification codes. In some embodiments, the at least one notification includes an identification of the selected alternate one of the brick-and-mortar stores $25_1$-$25_L$. Alternatively or additionally, the notification may include information relating to instructions transmitted by the main server 12 at step 926, e.g., a notification that the product identified by the matching one of the product identification codes is being held for the identified customer at the selected alternate one of the brick-and-mortar stores $25_1$-$25_L$. The notification may additionally include information relating to the location of the selected alternate one of the brick-and-mortar stores $25_1$-$25_L$, postal address, geographic coordinates and/or the like. The notification may also include information relating to the location(s) of the identified product within the selected alternate one of the brick-and-mortar stores $25_1$-$25_L$.

At step 930, the one or more signals wirelessly transmitted by the main server 12 at step 928 is/are received by the identified customer's mobile communication device 16, and thereafter at step 932 the processor 200 is illustratively operable to control the display 218 to display the one or more notifications transmitted by the main server 12. In embodiments in which the notification transmitted by the main server 12 at step 928 includes the location of the selected alternate one of the brick-and-mortar stores $25_1$-$25_L$ and/or in embodiments in which the identified customer's mobile communication device 16 already has access to such location information, the process 900 may optionally include step 934 where the processor 200 is operable to launch, i.e., activate a conventional navigation application, e.g., a NAV application 216 optionally stored in the memory 204 or data storage 206 of the device 16, which is illustratively operable in a conventional manner to guide the identified customer, e.g., via voice and/or visual data displayed on the display 218, to the location of the selected alternate one of the brick-and-mortar stores $25_1$-$25_L$. Following step 934, or step 932 in embodiments that do not include step 934, or following the "NO" branch of step 920, the process 900 terminates as illustrated in FIG. 9 and returns to step 526 of the process 500 illustrated in FIG. 5.

Out-of-Stock Process

Referring now to FIG. 10, a simplified flow diagram is shown of an embodiment 1000 of the out-of-stock process executed at step 528 of the process 500 illustrated in FIG. 5. The framework of the process 1000 illustrated in FIG. 10 is identical to that illustrated in FIGS. 5, 6B, 8A, 8B and 9, and the portion of the process 1000 centered under the heading "MCD," illustratively represents one or more software applications executed by the processor 200 of a customer's mobile communication device 16, i.e., one of the mobile communication devices $16_1$-$16_J$ associated with a customer of the retail enterprise 11, and the portion centered under the heading "Main Server" illustratively represents one or more software applications executed by the processor 50 of the main server 12. In one embodiment, the left portion of the process 1000 is or includes the OOSI application module 214 stored in the memory 204 (and/or data storage 206) of the customer's mobile communication device 16 in the form of instructions executable by the processor 200 of the customer's mobile communication device 16. The process steps of this portion of the process 1000 will be described below for purposes of this disclosure as being executed by the processor 200 of the customer's mobile communication device 16. The right portion of the process 1000 is illustratively stored in the out-of-stock process module 352 in the form of instructions executable by the processor 50 of the main server 12. The process steps of this portion of the process 1000 will be described below for purposes of this disclosure as being executed by the processor 50 of the main server 12. In some alternate embodiments, e.g., that may or may not include a main server 12, this portion of the process 1000 may alternatively be stored in the memory 34 (and/or data storage 36) of one or more of the local servers 22 in the form of instructions executable by the processor 32 of the one or more local servers 22, stored in the memory of one of the point-of-sale systems $24_1$-$24_M$ within one or more of the brick-and-mortar enterprise stores $25_1$-$25_L$ in the form of instructions executable by a processor associated with any such point-of-sale system $24_1$-$24_M$ and/or stored in a memory and executable by a processor of another system external to or supplemental to the system 10 illustrated FIG. 1. It will further be understood that portions of the process 1000 illustrated as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 1000 begins at step 1002 where the processor 50 of the main server 12 is illustratively operable to determine an expected receipt or arrival date at the identified one of the brick-and-mortar stores $25_1$-$25_L$, at any of the nearby ones of the brick-and-mortar stores $25_1$-$25_L$ identified at step 522 of the process 500 and/or at any of the brick-and-mortar stores $25_1$-$25_L$ within a predefined radius of the home address, city, zip code or other identifier associated with the identified customer, of new stock of the identified product. In embodiments in which the product information stored in the product/inventory database 312 includes information relating to future inventory of the product at each of the brick-and-mortar stores $25_1$-$25_L$, the processor 50 is illustratively operable to execute step 1002 by retrieving results of the search conducted at step 516 of the process 500 and/or by re-searching such data for real or projected delivery dates to any such ones of the brick-and-mortar stores $25_1$-$25_L$ of the product identified by the matching one of the product identification codes. Thereafter at step 1004, the processor 50 is illustratively operable to determine one or more alternate products in-stock at any of the nearby ones of the brick-and-mortar stores $25_1$-$25_L$ identified at step 522 of the process 500 and/or at any of the brick-and-mortar stores $25_1$-$25_L$ within a predefined radius of the home address, city, zip code or other identifier associated with the identified customer, to offer to the identified customer as one or more substitutes for the product identified by the matching product identification code. In one embodiment, the processor 50 is illustratively operable to execute step 1004 by retrieving the results of the search conducted step 516 of the process 500 and/or by re-searching the product/inventory database 312 for products that match the product identified by the matching product identification code according to predefined comparison criteria, examples of which are described above, and that are presently in-stock (and in quantities sufficient to satisfy the customer's desired quantity) at one or more of the nearby ones of the brick-and-mortar stores $25_1$-$25_L$ identified at step 522 of the process 500 and/or at one or more of the brick-and-mortar stores $25_1$-$25_L$ within a predefined radius of the home address, city, zip code or other identifier associated with the identified customer.

Following step 1004, the processor 50 is illustratively operable at step 1006 to determine whether the product identified by the matching product identification code is presently discounted, i.e., "on-sale," at the identified one of the brick-and-mortar stores $25_1$-$25_L$, i.e., at the one of the brick-and-mortar stores $25_1$-$25_L$ at which the identified customer is presently located. If not, the process 1000 is optionally operable at step 1010, as indicated by the dashed-line box 1010, to generate a virtual discount coupon for the product identified by the matching one of the product identification codes or retrieve a previously generated virtual discount coupon for the product from the virtual discount coupon (VDC) database 316. In embodiments which do not include the optional step 1010, the process 1000 advances from the "NO" branch of step 1006 to step 1012.

If, at step 1004, the processor 50 determines that the product identified by the matching product identification code is presently discounted, i.e., "on-sale," at the identified one of the brick-and-mortar stores $25_1$-$25_L$, i.e., at the one of the brick-and-mortar stores $25_1$-$25_L$ at which the identified customer is presently located, the process 1000 advances to step 1008 where the processor 50 is illustratively operable to generate a virtual discount coupon for the product identified by the matching one of the product identification codes or for any of the one or more alternate products determined at step 1004, or retrieve a previously generated virtual discount coupon for the product or alternate product(s) from the virtual discount coupon (VDC) database 316. In one embodiment, the discount amount of the virtual discount coupon generated or retrieved at step 1008 is illustratively equivalent to the discounted amount of the product at the identified one of the brick-and-mortar stores $25_1$-$25_L$ such that, if and when redeemed at any of the brick-and-mortar stores $25_1$-$25_L$, the customer will receive the same discount for the product when available or for one or more of the alternate products determined at step 1004, as if the product had been available at, and was purchased by the customer from, the identified one of the brick-and-mortar stores $25_1$-$25_L$ at the time of execution of step 1008. In some alternative embodiments, the discount amount of the virtual discount coupon generated or retrieved at step 1008 is greater than the discounted amount of the product at the identified one of the brick-and-mortar stores $25_1$-$25_L$ such that, when redeemed at any of the brick-and-mortar stores $25_1$-$25_L$, the customer will receive a greater discount on the product or on one or more of the alternate products determined at step 1004, than if the product had been available at, and was purchased by the customer from, the identified one of the brick-and-mortar stores $25_1$-$25_L$ at the time of execution of the processes 500 and 1000.

In any case, the process 1000 advances from step 1008 and from step 1010 (or from the "NO" branch of step 1006 if the process 1000 does not include step 1010) to step 1012 where the processor 50 is illustratively operable to wirelessly transmit one or more signals to the identified customer's mobile communication device 16 carrying at least one message relating to the product identified by the matching product identification code. In one embodiment, the at least one message wirelessly transmitted at step 1012 illustratively includes a notification that the item sought by the identified customer is not presently in stock at the identified one of the brick-and-mortar stores $25_1$-$25_L$. Additionally, the at least one message may include a notification that the item sought by the identified customer is not presently in stock at any nearby one of the brick-and-mortar stores $25_1$-$25_L$. Alternatively or additionally, in embodiments in which the processor 50 of the server 12 is operable at step 516 to determine one or more reasons why the product sought by the customer is not presently in stock at the identified one of the brick-and-mortar stores $25_1$-$25_L$ and/or at any nearby one or more of the brick-and-mortar stores $25_1$-$25_L$, the at least one message may include any such one or more reasons. Alternatively or additionally, the at least one message may illustratively include a notification that one or more such items are expected to be in stock in the identified one of the brick-and-mortar stores $25_1$-$25_L$ by the real or projected delivery date to the identified one of the brick-and-mortar stores $25_1$-$25_L$ determined at step 1002. Alternatively or additionally, the at least one message may illustratively include a notification of one or more of the alternate items determined at step 1004 that are in-stock and available for purchase at the identified one of the brick-and-mortar stores $25_1$-$25_L$. Alternatively or additionally still, the at least one message may illustratively include the virtual coupon generated or retrieved from the VDC repository 306 at step 1008 or step 1010. Alternatively or additionally, the at least one message may illustratively include information relating to a process for ordering the product identified by the matching one of the product identification codes.

At step 1014, the identified customer's mobile communication device 16 receives the one or more messages wirelessly transmitted by the main server 12 at step 1012, and at step 1016 the processor 200 of the identified customer's mobile communication device 16 is illustratively operable to control the display 218 to display at least one of the one or more wirelessly receive messages. In embodiments in which at least one message received from the main server 12 at step 1014 includes a virtual discount coupon, the processor 200 is illustratively operable to control the display 218 to display the virtual discount coupon. Illustratively, the processor 200 is further operable at step 1018 to execute a conventional virtual discount coupon "clipping" process via which the identified customer may manually select the displayed virtual discount coupon to store the virtual discount coupon in the memory 204 or data storage 206 of the mobile communication device 16 and/or to store the displayed virtual discount coupon in the customer's virtual discount coupon repository of the VDC repository 316 in the server database 302.

In embodiments in which at least one message received from the main server 12 at step 1014 includes a notification of one or more of the alternate items determined at step 1004 that are in-stock and available for purchase at one or more alternate ones of the brick-and-mortar stores $25_1$-$25_L$, e.g., as determined at step 1004), the processor 200 is further illustratively operable at step 1020 to display the one or more alternate items, e.g. in the form of a selectable one or menu of such alternate products. In such embodiments, the process 1000 also advances from step 1016 to step 1020 where the processor 200 is illustratively operable to determine whether the one of the one or more alternate products displayed on the display 218 have been manually selected. If so, the process 1000 advances to step 1022 where the process 1000 is directed to advance to step 916 of the process 900 where the processor 200 is operable to display a list of such alternate stores and guide the customer through a choice thereof. Otherwise, the process 100 advances to step 1024 where the processor 200 is operable, in embodiments in which at least one message received from the main server 12 at step 1014 includes information relating to a process for ordering the product identified by the matching one of the product identification codes, e.g., in the form of a selectable product ordering element, to determine whether or not the selectable ordering element has been selected. If not, the process 1000 terminates as illustrated in FIG. 10 and returns to step 528 of the process 500 illustrated FIG. 5. Otherwise, the process 100 advances to step 1026 where an interactive product ordering process is executed by the processor 200 of the identified customer's mobile communication device 16 and the processor 50 of the main server 12. Following step 1026, the process 1000 terminates and returns to step 528 of the process 500 illustrated in FIG. 5. The process 500 illustratively terminates following execution of any of steps 520, 526 and 528.

Referring now to FIG. 11, a simplified flow diagram is shown of an embodiment 1100 of the product ordering process executed at step 1026 of the process 1000 illustrated in FIG. 10. The framework of the process 1100 illustrated in FIG. 11 is identical to that illustrated in FIGS. 5, 6B, 8A, 8B, 9 and 10, and the portion of the process 1100 centered under the heading "MCD," illustratively represents one or more software applications executed by the processor 200 of a customer's mobile communication device 16, i.e., one of the mobile communication devices $16_1$-$16_J$ associated with a customer of the retail enterprise 11, and the portion centered under the heading "Main Server" illustratively represents one or more software applications executed by the processor 50 of the main server 12. In one embodiment, the left portion of the process 1100 is or includes the OOSI application module 214 stored in the memory 204 (and/or data storage 206) of the customer's mobile communication device 16 in the form of instructions executable by the processor 200 of the customer's mobile communication device 16. The process steps of this portion of the process 1100 will be described below for purposes of this disclosure as being executed by the processor 200 of the customer's mobile communication device 16. The right portion of the process 1100 is illustratively stored in the out-of-stock process module 352 in the form of instructions executable by the processor 50 of the main server 12. The process steps of this portion of the process 1100 will be described below for purposes of this disclosure as being executed by the processor 50 of the main server 12. In some alternate embodiments, e.g., that may or may not include a main server 12, this portion of the process 1100 may alternatively be stored in the memory 34 (and/or data storage 36) of one or more of the local servers 22 in the form of instructions executable by the processor 32 of the one or more local servers 22, stored in the memory of one of the point-of-sale systems $24_1$-$24_M$ within one or more of the brick-and-mortar enterprise stores $25_1$-$25_L$ in the form of instructions executable by a processor associated with any such point-of-sale system $24_1$-$24_M$ and/or stored in a memory and executable by a processor of another system external to or supplemental to the system 10 illustrated FIG. 1. It will further be understood that portions of the process 1100 illustrated as being executed by one processor/device or one processor/server or one processor/system may alternatively be executed by a different processor/device or processor/server or processor/system in the system 10, and/or by two or more such processors in any one or combination of such devices, servers and/or systems, some examples of which are described above.

The process 1100 begins at step 1102 where the processor 200 of the identified customer's mobile communication device 16 is illustratively operable to control the display 218 to display a product ordering graphic user interface (GUI) with selectable GUI elements for pickup, e.g., in-store purchase, or delivery, e.g., home delivery or delivery to another specified location. If, in response to the product ordering GUI displayed at step 1102, the pickup GUI element is manually selected, the process 1100 advances to step 1104 where the processor 200 is illustratively operable to control the display 218 to display a store identification GUI which illustratively includes a list or menu of one or more of the brick-and-mortar stores $25_1$-$25_L$, and which may identify one of the brick-and-mortar stores $25_1$-$25_L$ as a default or home store. Upon manual selection of one of the brick-and-mortar stores $25_1$-$25_L$ displayed at step 1104, the processor 200 is illustratively operable at step 1106 to generate a message or notification identifying the pickup option and identifying the selected one of the brick-and-mortar stores $25_1$-$25_L$. Illustratively, the message or notification may further include, have appended thereto or be followed by one or more virtual discount coupons that may have been transmitted to the identified customer's mobile communication device as part of the process 1000 illustrated in FIG. 10, or the message or notification may further include, have appended thereto or be followed by a code, e.g., EMSID, and/or instructions to apply to the order one or more virtual discount coupons stored in the customer's virtual discount repository of the VDC repository 316 in the server database 302.

If, in response to the product ordering GUI displayed at step 1102, the delivery GUI element is manually selected, the process 1100 advances to step 1108 where the processor 200 is illustratively operable to control the display 218 to display a delivery GUI with fields for entering a delivery address. In some embodiments, such fields may be pre-populated with the customer's home or business address. In any case, upon entry and/or selection of address information into the delivery address fields, the process 1100 advances to step 1110 where the processor 200 is illustratively operable to display a payment GUI with fields for entering payment information, e.g., credit card, debit card or the like. In some embodiments, such fields may be at least partially pre-populated with pre-identified customer payment information. Upon entry and/or selection of payment information, the process 1100 advances to step 1112 where the processor 200 is illustratively operable to generate a message or notification identifying the delivery option, the delivery address and payment information. Illustratively, the message or notification may further include, have appended thereto or be followed by one or more virtual discount coupons that may have been transmitted to the identified customer's mobile communication device as part of the process 1000 illustrated in FIG. 10, or the message or notification may further include, have appended thereto or be followed by a code, e.g., EMSID, and/or instructions to apply to the order one or more virtual discount coupons stored in the customer's virtual discount repository of the VDC repository 316 in the server database 302.

At step 1114, the processor 200 is illustratively operable to wirelessly transmit one or more signals to the main server 12 which include the one or more messages or notifications generated at step 1106 or at step 1112, and at step 1116 the main server 12 is operable to receive the one or more signals wirelessly transmitted by the identified customer's mobile communication device 16. The processor 50 of the main server 12 is further illustratively operable at step 1116 to process the one or more signals to determine whether the identified customer has specified pickup or delivery.

If the processor 50 determines at step 1116 that the identified customer specified pickup at step 1104, the process 1100 advances to step 1118 where the processor 50 is operable to deduct the discount amount of any virtual discount coupons contained in, carried by or otherwise identified in or by the one or more signals wirelessly received at step 1116 from the price of the product identified by the matching one of the product identification codes. Thereafter at step 1120, the processor 50 is illustratively operable to place or otherwise register the order for the identified product to be delivered to the selected one of the brick-and-mortar stores $25_1$-$25_L$. Thereafter at step 1122, the processor 50 is illustratively operable to determine or estimate a date and/or time that the product will be available at the selected store for pickup, and at step 1124 the processor 50 is illustratively operable to generate one or more messages which include a confirmation of the order and which illustratively include a notification of an actual or estimated date and/or time that the ordered product will be available for pickup at the identified store.

If the processor 50 determines at step 1116 that the identified customer specified deliver at step 1104, the process 1100 advances to step 1126 where the processor 50 is operable to deduct the discount amount of any virtual discount coupons contained in, carried by or otherwise identified in or by the one or more signals wirelessly received at step 1116 from the price of the product identified by the matching one of the product identification codes. Thereafter at step 1128, the processor 50 is illustratively operable to process the payment information specified by the identified customer at step 1110, and at step 1130 the processor 50 is illustratively operable to place or otherwise register the order for the identified product to be delivered to the address specified by the identified customer at step 1108. Thereafter at step 1132, the processor 50 is illustratively operable to determine or estimate a date and/or time that the product will be shipped to and/or delivered to the specified address, and at step 1134 the processor 50 is illustratively operable to generate one or more messages which include a confirmation of the order and which illustratively include a notification of an actual or estimated shipping and/or delivery date.

At step 1136, the processor 50 is illustratively operable to wirelessly transmit one or more signals to the identified customer's mobile communication device 16 which include the one or more messages or notifications generated at step 1124 or at step 1134, and at step 1138 the identified customer's mobile communication device 16 is operable to receive the one or more signals wirelessly transmitted by the main server 12. The processor 200 of the customer's mobile communication device 16 is thereafter illustratively operable at step 1140 to control the display 218 to display the one or more messages or notifications wirelessly transmitted by the main server 12 at step 1136.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. Moreover, it will be understood that while several process steps in various sequences have been illustrated and described herein with respect to the processes 500, 600, 800, 830, 900, 1000 and 1100, any one or more such processes 500, 600, 800, 830, 900, 1000 and 1100 may alternatively include more, fewer and/or different steps, and that any such steps may be executed in different sequences from those illustrated and described, without departing from the scope of the concepts and techniques described herein. It will be further understood that while the foregoing concepts and techniques have been illustrated and described in the context of a single out-of-stock item, such concepts and techniques are readily extendable to multiple ones of the out-of-stock items and/or to multiple out-of-stock products. Those skilled in the art will recognize that any modifications made to any of the processes illustrated and described herein to accommodate multiple out-of-stock ones of the same out-of-stock product and/or to accommodate multiple out-of-stock products would be a mechanical step for a skilled programmer, and that modifications to the concepts and techniques described the scope of this disclosure.

It will be further understood that while various embodiments have been illustrated and described herein in which information is wirelessly transmitted by communication circuitry of a customer's mobile communication device 16 and received by communication circuitry of the main server 12 and in which information is wirelessly transmitted by communication circuitry of the main server 12 and received by communication circuitry of a customer's mobile communication device 16, the transfer of some such information between the main server 12 and customer mobile communication devices 16$_1$-16$_K$ may alternatively be accomplished via a web site or web portal established, controlled and managed by the main server 12 and accessible by customer mobile communication devices 16$_1$-16$_K$ via the public network 14 (and, in some embodiments, with the aid of one or more hotspots established by one or more corresponding WiFi Access Points 28 under control of the main server 12). In such alternative embodiments, for example, all informational displays and all information contained therein may be controlled and managed by the main server 12 on such a web site or web portal, and customer mobile communication devices 16$_1$-16$_K$ may view such informational displays and enter information therein by accessing such a web site or web portal.

In the embodiments described herein, the position identification devices 26$_1$-26$_N$ have been described as being implemented as wireless signal broadcasting devices, e.g., conventional radio frequency broadcasting wireless signal broadcasting devices, configured to broadcast wireless signals each containing UID. In some alternate embodiments, one or more of the PIDs may be implemented as wireless signal transceivers configured to can broadcast and receive wireless signals and/or as wireless signal receivers configured to receive broadcast wireless signals, e.g., broadcast by a mobile communication device or other device and, in some cases, to communicate directly (wired and/or wirelessly) with the main server 12, one or more of the local hub servers 22 and/or one or more of the POS systems 24. In some such embodiments, one or more of the wireless signal transceivers and/or receivers may include one or more conventional processors and one or more memory devices having instructions stored therein executable by the one or more processors to execute one or more of steps for determining an identity of an individual carrying a mobile communication device within and/or near a store 25.

In other alternate embodiments, one or more PIDs 26$_1$-26$_N$ may be implemented in the form of a combination of conventional Global Positioning System (GPS) satellites and a GPS receiver on-board a mobile communication device.

In other alternate embodiments, one or more PIDs 26$_1$-26$_N$ may be implemented in the form of one or more in-store WiFi Access Points which establish one or more in-store or store-wide hotspot having a unique internet access ID (HotSpotID) accessible by a mobile communication device. In such embodiments, the server 12 may determine a location of a mobile communication device in accordance with the unique internet access ID used by the mobile communication device to communicate with the mobile communication device.

In other alternate embodiments, one or more PIDs 26$_1$-26$_N$ may be implemented in the form of a combination of the earth's Geomagnetic Field and a magnetometer on-board a mobile communication device. In such embodiments, the server 12 may determine the location of a mobile communication device in accordance with the unique magnetic field signature captured by the magnetometer and wirelessly transmitted to the server 12 by the mobile communication device. In such embodiments, the server database may have one or more maps, tables, lists or the like mapping magnetic signature profiles within one or more of the stores to locations or positions within one or more of the stores, and the server 12 may be operable in such embodiments to determine the in-store location or position of a mobile communication device by comparing the unique magnetic field signature wirelessly transmitted by the mobile communication device to the stored magnetic signature profiles.

In other alternate embodiments, one or more of the PIDs 26$_1$-26$_N$ may be implemented in the form of a combination of a camera on-board a mobile communication device and a product label affixed to product or product location within a store. In such embodiments, the camera may be operated to capture an image of the product label and wirelessly transmit the image to the server. The server may then compare the image to stored product data to determine the in-store location thereof.

In other alternate embodiments, one or more of the PIDs 26$_1$-26$_N$ may be implemented in the form of a combination of a mobile communication device with a keypad and a customer/employee application operating on the mobile communication device. In such embodiments, the customer/employee application may display one or more manually selectable GUI elements for manually entering the location of the mobile communication device, and the mobile communication device may then wirelessly transmit the location information to the server.

In other alternate embodiments, one or more of the PIDs 26$_1$-26$_N$ may be implemented in the form of a wireless signal transmission device, e.g., RFID Tag, NFC device, etc., attached to customer-selected product. In such embodiments, the wireless signal transmission device may be configured to wirelessly transmit product information (e.g., brand, size, etc.) and/or location (e.g., department, aisle, shelf position, etc.) to a mobile communication device which then wirelessly transmits the information to the server.

In other alternate embodiments, one or more of the PIDs $26_1$-$26_N$ may be implemented in the form of a combination of one or more in-store Cameras and a server-based facial and/or product recognition application. In some such embodiments, the server may process camera images and/or video and compare facial images with stored customer images to identify customers. In other embodiments, the server may process the camera images and/or video and compare product images, e.g., in customer's possession (basket, hand-carried, etc.) with stored product images, and then predict the customer's identity based on information contained in customer shopping histories.

In other alternate embodiments, one or more PIDs $26_1$-$26_N$ may be implemented in the form of a combination of one or more electromagnetic radiation (EMR) generators positioned within a store 25 and a mobile communication device with a camera and/or microphone. In such embodiments, the EMR may be generated in one or more spectral ranges, and be made to vary locally from store-to-store and throughout each store in one or more detectable EMR properties or characteristics, and/or EMR having different properties or characteristics may be generated in each store and in different areas of each store, such that in any case different stores, and different areas within each store, will be subject to different generated EMR properties or characteristics. The different EMR properties and/or characteristics generated in each store and in each area of each store may be stored in an EMR database, and local EMR properties/characteristics may be detected by a mobile communication device and wirelessly transmitted to the server which may then compare such received information to the EMR database to determine the location of the mobile communication device. Examples of such EMR generators and corresponding EMR detectors include, but are not limited to, one or more visible Light Generators and a camera on-board a mobile communication device, one or more audible frequency Generators and a microphone on-board a mobile communication device, one or more radio frequency generators and a radio frequency generator on board a mobile communication device, and the like.

In other alternate embodiments, one or more PIDs $26_1$-$26_N$ may be implemented in the form of one or more mobile communication devices of one or more in-store customers or in-store Employees. In such embodiments, in-store mobile communication devices may be configured to periodically broadcast signals detected by a customer's mobile communication device and/or transmitted directly to the server. Such broadcast signals be or include "location information" signals based on one or more "hard events" such as a recently received unique identification signal transmitted by an in-store wireless signal broadcasting device, a recently scanned or imaged product code, detected product device data, recently received GPS data, recently used HotSpotID data, recently detected EMR data, and/or the like. Alternatively or additionally, the one or more broadcast signals may be or include location information signals based on one or more "soft events" such as locally detected sounds (generated or not), locally detected light (generated or not), locally detected RF signals, and/or the like.

In any of the foregoing embodiments, information may be transmitted, receive and/or processed by any one or combination of any system or device disclosed herein.

What is claimed is:

1. A method of obtaining inventory missing or understocked at a brick-and-mortar store of a retail enterprise, the method comprising:

with a processor, associating in a database each of a plurality of product codes stored in the database with one or more of a plurality of store codes and each of the associated one or more of the plurality of store codes with an inventory number, each of the plurality of product codes identifying a corresponding one of a plurality of products offered for sale by the retail enterprise, each of the one or more of the plurality of store codes identifying a different one of a plurality of brick-and-mortar stores of the retail enterprise that normally stocks the one of the plurality of products identified by the associated one of the plurality of product codes, and each inventory number identifying a quantity of the one of the plurality of products identified by the associated one of the plurality of product codes currently in inventory at the one of the plurality of brick-and-mortar stores identified by the associated one of the one or more of the plurality of store codes, with the processor, receiving a wireless communication transmitted by a mobile communication device from within one of the plurality of brick-and-mortar stores of the retail enterprise, the received wireless communication including communication information identifying the transmitting mobile communication device, a store code identifying the one of the plurality of brick-and-mortar stores within which the transmitting mobile communication device transmitted the wireless communication and a product code captured by the transmitting mobile communication device, in response to user interaction therewith, from a product label positioned at a location within the one of the plurality of brick-and-mortar stores where the one of the plurality of products, associated in the database with the one of the plurality of product codes identified on the product label, is normally stocked but is currently missing or stocked in a quantity that is less than that desired by the user of the transmitting mobile communication device, with the processor, determining the one of the plurality of product codes in the database that matches the product code included in the received wireless communication, with the processor, determining the one of the one or more of the plurality of store codes associated in the database with the determined one of the plurality of product codes that matches the store code included in the received wireless communication, with the processor, determining the inventory number associated in the database with the determined one of the one or more of the plurality of store codes, wirelessly transmitting, under control of the processor, a notification message to the mobile communication device identified by the communication information included in the received wireless communication, the notification message including information, based on the determined inventory number, relating to an availability within the one of the plurality of brick-and-mortar stores of the retail enterprise associated in the database with the determined one of the one or more of the plurality of store codes of the one of the plurality of products identified by the determined one of the plurality of product codes and that is currently missing, or stocked in a quantity that is less than that desired by the user of the transmitting mobile communication device, at the location in the one of the plurality of brick-and-mortar stores where the one of the plurality of products associated in the database with the determined one of the plurality of product codes is normally stocked, upon determining, with the processor, that the determined inventory number is less than or equal to a threshold number:
- determining, with the processor, each store code in a subset of the one or more of the plurality of store codes associated in the database with the determined one of the plurality of product codes,
- determining, with the processor, the inventory number associated in the database with each store code in the determined subset of the one or more of the plurality of store codes,
- wherein the information included in the notification message further includes information confirming availability of the one of the plurality of products identified by the determined one of the plurality of product codes at each of one or more of the plurality of brick-and-mortar stores identified by a respective one of the one or more of the plurality of store codes in the determined subset of the one or more of the plurality of store codes for which the corresponding determined inventory number is greater than the threshold number, determining, with the processor, whether the one of the plurality of products identified by the determined one of the plurality of product codes has a discounted price at the one of the plurality of brick-and-mortar stores associated in the database with the determined one of the one or more of the plurality of store codes, determining, with the processor, whether the one of the plurality of products identified by the determined one of the plurality of product codes has a discounted price at any of the one or more of the plurality of brick-and-mortar stores identified by corresponding ones of the one or more of the plurality of store codes in the determined subset of the one or more of the plurality of store codes for which the corresponding determined inventory number is greater than the threshold number, generating or retrieving from a database a first virtual discount coupon for the one of the plurality of products identified by the determined one of the plurality of product codes upon determining that the one of the plurality of products identified by the determined one of the plurality of product codes has a discounted price at the one of the plurality of brick-and-mortar stores associated in the database with the determined one of the one or more of the plurality of store codes and does not have a discounted price at any of the one or more of the plurality of brick-and-mortar stores identified by corresponding ones of the one or more of the plurality of store codes in the determined subset of the one or more of the plurality of store codes for which the corresponding determined inventory number is greater than the threshold number, and wirelessly transmitting, under control of the processor, the first virtual discount coupon to the mobile communication device identified by the communication information included in the wireless communication.

2. The method of claim 1, further comprising:
with the processor, storing in the database a plurality of customer codes each identifying a different one of a plurality of customers of the retail enterprise,
with the processor, associating in the database each of the plurality of customer codes with a different one of a corresponding plurality of communication identifiers identifying a mobile communication device associated with a respective one of the plurality of customers, and
in response to wirelessly received information including a pickup request and a selected store code, transmitted by the transmitting mobile communication device in response to user interaction therewith, wirelessly transmitting, under control of the processor, an instruction message to an electronic device or system within and associated with the one of the plurality of brick-and-mortar stores associated in the database with the selected store code, the instruction message including instructions to hold for pickup by the one of the plurality of customers of the retail enterprise, identified by the one of the plurality of customer codes associated in the database with the one of the plurality of communication identifiers matching the communication information identifying the transmitting mobile communication device, one or more of the one of the plurality of products identified by the determined one of the plurality of product codes.

3. The method of claim 2, further comprising wirelessly transmitting, under control of the processor, a confirmation message to the mobile communication device identified by the communication information included in the wireless communication, the confirmation message including confirmation of the one or more of the one of the plurality of products identified by the determined one of the plurality of product codes being held for the one of the plurality of customers at the one of the plurality of brick-and-mortar stores associated in the database with the selected store code.

4. The method of claim 1, wherein, if the determined inventory number associated with each of the one or more corresponding store codes in the determined subset is less than or equal to the threshold number, the information included in the notification message further includes information relating to present unavailability of the one of the plurality of products identified by the determined one of the plurality of product codes and information for ordering the one of the plurality of products identified by the determined one of the plurality of product codes from the retail enterprise using the mobile communication device identified by the communication information included in the wireless communication.

5. The method of claim 1, wherein a discount amount of the first virtual coupon is equivalent to a discounted amount of the one of the plurality of products identified by the determined one of the plurality of product codes as having a discounted price at the one of the plurality of brick-and-mortar stores associated in the database with the determined one of the one or more of the plurality of store codes.

6. The method of claim 1, wherein a discount amount of the first virtual coupon is greater than a discounted amount of the one of the plurality of products identified by the determined one of the plurality of product codes as having a discounted price at the one of the plurality of brick-and-mortar stores associated in the database with the determined one of the one or more of the plurality of store codes.

7. The method of claim 1, further comprising:
generating or retrieving from a database a second virtual discount coupon for the one of the plurality of products identified by the determined one of the plurality of product codes if the one of the plurality of products identified by the determined one of the plurality of product codes does not have a discounted price at the one of the plurality of brick-and-mortar stores associated in the database with the determined one of the one or more of the plurality of store codes, and wirelessly transmitting, under control of the processor, the second virtual discount coupon to the mobile communication device identified by the communication information included in the wireless communication.

8. The method of claim 1, wherein the information included in the notification message further includes a notification that the one of the plurality of products identified by the determined one of the plurality of product codes is not presently in stock at the one of the plurality of brick-and-mortar stores within which the transmitting mobile communication device transmitted the wireless communication.

\* \* \* \* \*